(12) United States Patent
Rietman et al.

(10) Patent No.: US 10,027,475 B2
(45) Date of Patent: Jul. 17, 2018

(54) KEY AGREEMENT DEVICE AND METHOD

(71) Applicant: KONINKLIJKE PHILIPS N.V., Eindhoven (NL)

(72) Inventors: Ronald Rietman, Eindhoven (NL); Oscar Garcia Morchon, Aachen (DE); Ludovicus Marinus Gerardus Maria Tolhuizen, Waalre (NL); Santos Merino Del Pozo, Santander (ES)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 130 days.

(21) Appl. No.: 14/903,325

(22) PCT Filed: Jul. 14, 2014

(86) PCT No.: PCT/EP2014/064996
§ 371 (c)(1),
(2) Date: Jan. 7, 2016

(87) PCT Pub. No.: WO2015/004286
PCT Pub. Date: Jan. 15, 2015

(65) Prior Publication Data
US 2017/0005792 A1   Jan. 5, 2017

Related U.S. Application Data

(60) Provisional application No. 61/845,391, filed on Jul. 12, 2013.

(30) Foreign Application Priority Data

Aug. 30, 2013   (EP) ..................... 13182342

(51) Int. Cl.
*H04L 9/08*     (2006.01)
*H04L 9/30*     (2006.01)

(52) U.S. Cl.
CPC .......... *H04L 9/0838* (2013.01); *H04L 9/0869* (2013.01); *H04L 9/0877* (2013.01);
(Continued)

(58) Field of Classification Search
CPC ... H04L 9/0838; H04L 9/0869; H04L 9/0877; H04L 9/3026; H04L 9/3093; H04L 2209/805
See application file for complete search history.

(56) References Cited

U.S. PATENT DOCUMENTS 5,519,778 A * 5/1996 Leighton ............... H04L 9/0841
380/279
6,055,508 A    4/2000 Naor et al.
(Continued)

FOREIGN PATENT DOCUMENTS

| JP | 2012503356 A | 2/2012 |
| WO | 2010032158 A2 | 3/2010 |
| WO | 2015003984 A1 | 1/2015 |

OTHER PUBLICATIONS

Chin-Ling Chen, Yu-Ting Tsai, Aniello Castiglione and Francesco Palmieri: 'Using bivariate polynomial to design a dynamic key management scheme for wireless sensor networks', ComSIS, vol. 10, No. 2, Special Issue, Apr. 2013, pp. 589-610.*

(Continued)

*Primary Examiner* — Catherine B Thiaw

(57) ABSTRACT

An initiating key-agreement device (100) and a responding key-agreement device (200) are provided, configured to generate a symmetric key shared between them. The devices are configured for generating in electronic form a private random value (112, 212), obtaining in electronic form a public set of bivariate polynomials (122) and computing a univariate polynomial (124, 222) by summing the univariate polynomials obtained by substituting the private random value (112, 212) into the polynomials of the public set (122).

(Continued)

The devices are configured to send their computed univariate polynomial to the other device, and to compute or reconstruct the shared symmetric key (214, 312) by substituting its generated private random value (112, 212) in the received univariate polynomial.

14 Claims, 4 Drawing Sheets

(52) U.S. Cl.
CPC .......... *H04L 9/3026* (2013.01); *H04L 9/3093* (2013.01); *H04L 2209/805* (2013.01)

(56) References Cited

U.S. PATENT DOCUMENTS

| | | | |
|---|---|---|---|
| 2004/0165726 A1* | 8/2004 | Yamamichi | H04L 9/085 380/277 |
| 2005/0021642 A1 | 1/2005 | Nanaka | |
| 2008/0069344 A1* | 3/2008 | Yao | H04L 9/0844 380/44 |
| 2010/0058059 A1* | 3/2010 | Schneider | H04L 9/3026 713/171 |
| 2010/0153731 A1 | 6/2010 | Duc et al. | |
| 2011/0033054 A1* | 2/2011 | Garcia Morchon | H04L 9/083 380/279 |
| 2011/0103583 A1* | 5/2011 | Yoon | H04L 9/302 380/255 |
| 2011/0197064 A1 | 8/2011 | Garcia Morchon et al. | |
| 2011/0200185 A1* | 8/2011 | Ghouti | H04L 9/3066 380/28 |
| 2011/0317838 A1* | 12/2011 | Garcia Morchon | H04L 9/085 380/259 |
| 2012/0084863 A1* | 4/2012 | Garcia Morchon | H04L 9/083 726/23 |

OTHER PUBLICATIONS

Blundo et al: "Perfectly-Secure Key Distribution for Dynamic Conferences"; Advances in Cryptology—Crypto'92 LNCS 740, PR 471-486, 1993.

Boucher et al: "Key Exchange and Encryption Schemes Based on Non-Commutative Skew Polynomials"; Post Quantum Cryptography, LNCS 6061, pp. 126-141, 2010.

Diffie et al: "New Directions in Cryptography"; IEEE Transactions on Information Theory, vol. IT-22, No. 6, Nov. 1976, pp. 644-654.

Gennaro et al: "Strongly-Resilient and Non-Interactive Hierarchical Key-Agreement in Manets"; Esorics 2008, LNCS 5281, 2008, pp. 49-65.

Yagisawa: "Key Agreement Protocols Based on Multivariate Polynomials"; International Association for Cryptologic Research, vol. 20101024:072856, Oct. 2010, pp. 1-3.

Kiltz et al: "Polynomial-Interpolation of Cryptographic Functions Related to Diffie-Hellman and Discrete Logarithm Problem"; Discrete Applied Mathematics, Elsevier Science, vol. 154, No. 2, Feb. 2006, pp. 326-336.

Garcia-Morchon et al: "Towards Full Collusion Resistant ID-Based Establishment of Pairewise Keys"; ePrint Archive 2012, Downloaded at http://eprint.iacr.org/2012/618, pp. 1-6.

Koblitz et al: "A Survey of Public-Key Cryptosystems"; SIAM Review, 2004 Society for Industrial and Applied Mathematics, vol. 46, No. 4, pp. 599-634.

Liu et al: "Establishing Pairwise Keys in Distributed Sensor Networks"; Proceedings of the 10th ACM Conference on Computer and Communications Security, 2003, pp. 52-61.

* cited by examiner

500

KEY AGREEMENT DEVICE AND METHOD

CROSS-REFERENCE TO PRIOR APPLICATIONS

This application is the U.S. National Phase application under 35 U.S.C. § 371 of International Application No. PCT/EP2014/064996, filed on Jul. 14, 2014, which claims the benefit of U.S. Provisional Patent Application No. 61/845,391 filed on Jul. 12, 2013 and European Patent Application No. 13182342.9, filed on Aug. 30, 2013. These applications are hereby incorporated by reference herein.

FIELD OF THE INVENTION

The invention relates to system for key agreement between an initiating key-agreement device and a responding key-agreement device.

BACKGROUND

In cryptography, a key-agreement protocol is a protocol whereby two or more parties that may not yet share a common key can agree on such a key. Preferably, both parties can influence the outcome so that neither party can force the choice of key. An attacker who eavesdrops on all communication between the two parties should learn nothing about the key. Yet, while the attacker who sees the same communication learns nothing or little, the parties themselves can derive a shared key.

Key agreement protocols are useful, e.g., to secure communication, e.g., to encrypt and/or authenticate messages between the parties.

Practical key agreements protocols were introduced in 1976 when Whitfield Diffie and Martin Hellman introduced the notion of public-key cryptography. They proposed a system for key agreement between two parties which makes use of the apparent difficulty of computing logarithms over a finite field GF(q) with q elements. Using the system, two users can agree on a symmetric key. The symmetric key may then be used for say, encrypted communication between the two parties.

Current key agreement methods applicable when the parties do not yet have a shared secret, such as the Diffie-Hellman key agreement method, require resource-heavy mathematical operations. For example, the Diffie-Hellman requires one to perform exponentiation operations over a finite field. Both the exponent and the field size may be large. This makes key agreement protocols less suitable for low-resource devices. On the other hand key agreement protocols would be very useful in resource-restrained devices. For example, in application areas such as the internet of things, ad-hoc wireless networks, and the like, key agreement could be used to protect links between devices. Another example is communication between a reader and an electronic tag, say a card reader and a smart card, or a tag reader and tag, e.g., an RFID tag or an NFC tag. It would be advantageous to have a key agreement protocol that places a smaller burden on at least one of the two parties, i.e., on the electronic tag.

Reference is made to the article "Key Exchange and Encryption Schemes Based on Non-commutative Skew Polynomials" by Delphine Boucher, et al. The article relates to a key exchange algorithm based on so-called non-commutative skew polynomials.

SUMMARY OF THE INVENTION

It would be advantageous to have an improved system for key agreement.

Current key agreement systems require heavy mathematical operations and thus they are less suitable for embedded systems, such as sensors, tags, lighting devices and similar devices which are computationally constrained. It would be advantageous to have an improved system for symmetric key encryption of messages. Moreover, as existing systems depend on the presumed—but unproven—difficulty of some mathematical problems, e.g., the discrete log problem over a finite field, it would be advantageous to have alternative key agreement systems that rely on different hardness assumptions.

An aspect of the invention concerns a system for key agreement comprising an initiating key-agreement device and a responding key-agreement device. In the system the initiating key-agreement device sends a message to the responding key-agreement device, which in turn responds with a message. Based on both messages each device may derive the shared symmetric key.

The key agreement provided by the devices in the system allows for efficient operation and is suited for resource-constrained devices. The devices of the system are further explained below. The key agreement may be used in lighting networks, e.g., that require secure communications. In general, the invention can be applied to any type of communication network requiring secure communication between pairs of devices.

The initiating key-agreement device, and responding key-agreement device are electronic devices; they may be a mobile electronic device, such as mobile phone, set-top box, computer, and the like. The initiating key-agreement device and responding key-agreement device may be resource-constrained such as a sensor, a lighting device, a LED lamp, a smart card, an RFID tag, and the like.

An aspect of the invention concerns an initiating key-agreement device configured to generate a symmetric key shared with a responding key-agreement device. The initiating key-agreement device comprises an initiating key data generator, a communication unit and a symmetric key obtainer.

The initiating key data generator is configured for generating in electronic form a first private random value, obtaining in electronic form a public set of bivariate polynomials, computing an initiating univariate polynomial by summing the univariate polynomials obtained by substituting the first private random value into the polynomials of the public set.

The communication unit is configured for sending the initiating univariate polynomial to the responding key-agreement device, and for receiving from the responding key-agreement device a responding univariate polynomial.

The symmetric key obtainer is configured for reconstructing a shared symmetric key by substituting the first private random value in the responding univariate polynomial.

An aspect of the invention concerns a responding key-agreement device configured to generate a symmetric key shared with an initiating key-agreement device, the shared symmetric key being for symmetric encryption and/or decryption of electronic messages. The responding key-agreement device comprises a communication unit, a responding key data generator, and a symmetric key obtainer.

The communication unit is configured for receiving from the initiating key-agreement device an initiating univariate polynomial, and for sending to the initiating key-agreement device a responding univariate polynomial.

The responding key data generator is configured for generating in electronic form a second private random value, obtaining in electronic form a public set of bivariate polynomials, computing the responding univariate polynomial by summing over univariate polynomials obtained by substituting the second private random value into the polynomials of the public set.

The symmetric key obtainer is configured for computing a shared symmetric key by substituting the second private random value in the initiating univariate polynomial.

To agree on a key the initiating key-agreement device obtains a public set of bivariate polynomials and generates a first private random number. From these, the initiating key-agreement device generates the initiating univariate polynomial. Knowledge of the initiating univariate polynomial and public set is not sufficient to determine the first private random value. Because the initiating key-agreement uses multiple polynomials when computing the initiating univariate polynomial, the relation between the initiating univariate polynomial and the first private random value is disturbed. The responding key-agreement device is capable of deriving a symmetric key, by substituting a second private random value in the initiating univariate polynomial. The responding key-agreement device also computes a responding univariate polynomial from the same public set and the second private random number. Using the responding univariate polynomial the initiating key-agreement device can obtain the same key as was obtained by the responding key-agreement device.

The system is especially well suited to applying different reduction functions to the univariate polynomials obtained by substituting the first private random value into the polynomials of the public set, i.e., before summing them. The different reduction functions are mathematically incompatible, i.e., the results of the reductions do not respect the addition in the ring in which the summing is performed.

Even with access to the public set, the initiating univariate polynomial and the responding univariate polynomial, an attacker cannot derive the shared key. Because the initiating key-agreement device and responding key-agreement device have access to their private random number, they can derive the key.

For some choices of parameters there is a chance that, due to the mixing induced by the multiple polynomials and their reductions, that the resulting key is not equal. This may be resolved in several ways. For example, some choices of parameters do guarantee equal keys, e.g., using polynomial rings; using key confirmation data, the initiating key-agreement device can reconstruct the key; it may be acceptable for some applications that an occasionally key-agreement fails.

In an embodiment, reduction functions are associated with at least two, but preferably all, polynomials in the public set. For example, the reduction function is a reduction in a ring, e.g., an integer ring, which may be implemented as a modulo operation, or a polynomial ring, which may be implemented as a polynomial reduction, say by computing the remainder when dividing by a reduction polynomial. Using two or more different reduction functions increases security. The reduction functions are applied to the univariate polynomials obtained by substituting the first or second private random value into the polynomials of the public set, before the summing thereof.

Information representing the reduction functions may be included in the public set, and obtained together with the public set.

Reconstructing the symmetric key may also comprise taking as key K b bits of the output, e.g., the least significant b-bits. A cryptographic unit of the initiating key agreement device may be configured to use the reconstructed symmetric key. The symmetric key is also referred to as 'K'.

In an embodiment, the initiating key-agreement device comprising an encryption unit configured for encrypting an electronic message with the shared symmetric key, and/or a decryption unit configured for decrypting an encrypted electronic message with the shared symmetric key.

In an embodiment, the responding key-agreement device comprises an encryption unit configured for encrypting an electronic message with the shared symmetric key, and/or a decryption unit configured for decrypting an encrypted electronic message with the shared symmetric key.

The shared symmetric key may be used for any cryptographic purpose that requires a cryptographic key. However, the symmetric key is suited to encryption and decryption. The key-agreement system is especially suitable in a system in which authentication is in place, e.g., through electronic signatures, certificates and the like, but encryption/decryption is not. The key-agreement is also especially suitable to generate ephemeral keys, even if some shared secret is available. By relying on the ephemeral key rather than the shared secret, forward security is obtained.

In an embodiment of the initiating key-agreement device, the public set of bivariate polynomials only comprises symmetric bivariate polynomials.

In an embodiment, of the responding key-agreement device, the public set of bivariate polynomials only comprises symmetric bivariate polynomials.

Symmetric polynomials simplify implementations somewhat. A symmetric polynomial needs fewer resources to store, also no bookkeeping is required to make sure that the two parties use a different variable for substituting. On the other hand, asymmetric polynomials are somewhat more secure.

In an embodiment of the initiating key-agreement device the public set of bivariate polynomials comprises at least two different bivariate polynomials, and/or at least one polynomial of the public set has a degree of at least two in one of the two variables of said at least one polynomial.

In an embodiment of the responding key-agreement device the public set of bivariate polynomials comprises at least two different bivariate polynomials, and/or at least one polynomial of the public set has a degree of at least two in one of the two variables of said at least one polynomial.

The system may also be used when two bivariate polynomials are the same provided their reduction, e.g. underlying ring, e.g., a local reduction integer is different. Using a different reduction function makes the operation of a polynomial different, even if its coefficients are the same.

In an embodiment, of the initiating key-agreement device, the initiating univariate polynomial is represented as a list of coefficients of the initiating univariate polynomial in a canonical form, and the responding univariate polynomial is represented as a list of coefficients of the responding univariate polynomial in a canonical form.

In an embodiment of the responding key-agreement device, the responding univariate polynomial is represented as a list of coefficients of the responding univariate polynomial in a canonical form.

Rewriting a polynomial to canonical form is one way to execute a reduction. The coefficients in the canonical form are taken from a set of values, such as a commutative ring. Canonical form reduction ensures that polynomials can only be represented in one form.

In an embodiment of the initiating key-agreement device a different commutative ring is associated with each polynomial of the public set of bivariate polynomials, and the initiating univariate polynomial is obtained by substituting the first private random value into a particular polynomial of the public set is reduced to a canonical form in the commutative ring associated with the particular univariate polynomial.

In an embodiment of the responding key-agreement a different commutative ring is associated with each polynomial of the public set of bivariate polynomials, and the responding univariate polynomial obtained by substituting the second private random value into a particular polynomials of the public set is reduced to a canonical form in the commutative ring associated with the particular univariate polynomial.

The univariate polynomials obtained by substituting the first private random value into the polynomials of the public set are reduced with different reduction functions, before they are summed. Therefore, it is hard to recover the first private random value from the initiating univariate polynomial, even with knowledge of the public set. The mathematical relationship that would be present when working, say, in a single finite field is disturbed. This means that the usual mathematical tools for analyzing polynomials, e.g., finite algebra, no longer apply. At best an attacker may use much less efficient structures, such as lattices. On the other hand the initiating and responding key agreement devices are likely to be able to derive the same shared key.

In an embodiment of the initiating key-agreement device a public global reduction integer is associated with the public set and a public individual reduction integer with each polynomial of the public set, the first private random value is an integer, each polynomial in the public set is a bivariate polynomial with integer coefficients, the initiating univariate polynomial is an univariate polynomial with integer coefficients. These parameters may be obtained in various ways, for example, they may be obtained by a initiating key data generator, e.g., together with the public set. The public individual reduction integers are also referred to as local reduction integers.

Computing the initiating univariate polynomial comprises obtaining a set of univariate polynomials by for each polynomial of the public set substituting the first private random value into said polynomial and reducing modulo the public individual reduction integer associated with said polynomial, and summing the set of univariate polynomials and reducing modulo the global reduction integer.

Reconstructing the symmetric key comprises substituting the first private random value in the responding univariate polynomial and reducing modulo the public global reduction integer.

In an embodiment of the responding key-agreement device, a public global reduction integer is associated with the public set and a public individual reduction integer with each polynomial of the public set, the second private random value is an integer, each polynomial in the public set is a bivariate polynomial with integer coefficients, the initiating univariate polynomial and responding univariate polynomial are univariate polynomials with integer coefficients.

Computing the shared symmetric key comprises substituting the second private random value in the initiating univariate polynomial and reducing modulo the global reduction integer.

Computing the responding univariate polynomial comprises obtaining a set of univariate polynomials by for each polynomial of the public set substituting the second private random value into the polynomial and reducing modulo the public individual reduction integer associated with said polynomial, and summing the set of univariate polynomials and reducing modulo the global reduction integer.

Is it useful that the public individual reduction integers are all distinct, since if two of them are equal, the public set may be simplified to have fewer polynomials. Nevertheless if some or all of the public individual reduction integers are equal the system would work correctly, although with the security that may be expected from a smaller system having fewer polynomials.

Adding two or more univariate polynomials that have been reduced modulo different moduli is an efficient way to obscure the relationship between private random value public set and the initiating/responding univariate polynomial.

In an embodiment, the public global reduction integer is an odd number larger than $2^{(\alpha+2)b-1}$ and/or lower than $2^{(\alpha+2)b}$, wherein $\alpha$ represents the highest degree in one of the two variables of the polynomials in the public set, and b represents a key length, and for each public individual reduction integer, the public global reduction integer minus said public individual reduction integer is a multiple of 2 to the power of the key length and is less than 2 to the power of twice the key length, and wherein computing the shared symmetric key further comprises reducing modulo 2 to the power of the key length.

In an embodiment of the responding key-agreement device, the public global reduction integer is an odd number larger than $2^{(\alpha+2)b-1}$ and/or lower than $2^{(\alpha+2)b}$, wherein $\alpha$ represents the highest degree in one of the two variables of the polynomials in the public set, and b represents a key length, and for each public individual reduction integer, the public global reduction integer minus said public individual reduction integer is a multiple of 2 to the power of the key length and is less than 2 to the power of twice the key length, and wherein computing the shared symmetric key further comprises reducing modulo 2 to the power of the key length.

In an embodiment of the responding key-agreement device, the responding key-data generator is configured for computing key confirmation data from the symmetric key for verifying if a reconstructed key equals said symmetric key, the communication unit being further configured for sending to the initiating key-agreement device the key confirmation data. The communication unit is configured to send the key confirmation data to the initiating key agreement device, e.g., together with the responding univariate polynomial.

In an embodiment of the initiating key-agreement device as in Claim 1, the symmetric key obtainer of the initiating key-agreement device is configured for deriving a first reconstructed key from the result of substituting the first private random value in the responding univariate polynomial and reducing modulo the public global reduction integer, determining from the key confirmation data if the first reconstructed key equals the symmetric key and if not deriving a further reconstructed key from the first reconstructed key.

In an embodiment of the initiating key-agreement device, deriving a further reconstructed key comprises adding the public global reduction integer or a multiple of the public global reduction integer to the first reconstructed key and reducing modulo the 2 to the power of the key length.

Using key confirmation data is one way to increase the likelihood or even ensure that a shared key is obtained.

In an embodiment of the initiating key-agreement device a public global reduction polynomial is associated with the public set and public individual reduction polynomials with each polynomial of the public set.

The first private random value is a polynomial, each particular polynomial in the public set is a bivariate polynomial with coefficients taken from the polynomial ring modulo the public individual reduction polynomial associated with the particular polynomial. The initiating univariate polynomial has polynomial coefficients. Computing the initiating univariate polynomial comprises obtaining a set of univariate polynomials by for each particular polynomial of the public set substituting the first private random value into said polynomial and reducing modulo the public individual reduction polynomial associated with said particular polynomial, and summing the set of univariate polynomials. Reconstructing the symmetric key comprises substituting the first private random value in the responding univariate polynomial and reducing modulo the public global reduction polynomial.

In an embodiment of the responding key-agreement device, a public global reduction polynomial is associated with the public set and public individual reduction polynomials with each polynomial of the public set. The second private random value is a polynomial, each particular polynomial in the public set is a bivariate polynomial with coefficients taken from the polynomial ring modulo the public individual reduction polynomial associated with the particular polynomial.

The responding univariate polynomial has polynomial coefficients.

Computing the symmetric key comprises substituting the second private random value in the initiating univariate polynomial and reducing modulo the global reduction polynomial. Computing the symmetric key may also comprise taking b bits of the result, e.g., the least significant b-bits.

Computing the responding univariate polynomial comprises obtaining a set of univariate polynomials by for each polynomial of the public set substituting the second private random value into the polynomial and reducing modulo the public individual reduction polynomial associated with said polynomial, and summing the set of univariate polynomials. Using polynomial rings ensures that the initiating key-agreement device does not need key-confirmation data to ensure that it obtains the correct shared symmetric key.

The global and local reduction polynomials may be chosen as polynomials having integer coefficients. The integer coefficients may be chosen as less than a pre-defined maximum. For example, the coefficients of the global and local reduction polynomials may be taken from an integer ring, e.g., the integers module a number. For example, the global and local reduction polynomials may be binary coefficients. The global and local reduction polynomials may be irreducible but this is not required.

An aspect of the invention concerns an initiating key-agreement method.

An aspect of the invention concerns a responding key-agreement method.

The initiating key agreement device and the responding key agreement device are electronic devices, e.g. mobile electronic devices; for example, they may be a mobile phone, a tablet, a computer or the like. The initiating key agreement device and the responding key agreement device may be integrated circuits, for example, as a card, sim, or tag. The initiating key agreement device and the responding key agreement device may be embedded, e.g., in a lighting device, such a luminaires, replaceable light units, such as bulbs, LEDs and the like.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code means stored on a computer readable medium for performing a method according to the invention when said program product is executed on a computer.

In a preferred embodiment, the computer program comprises computer program code means adapted to perform all the steps of a method according to the invention when the computer program is run on a computer. Preferably, the computer program is embodied on a computer readable medium.

An initiating key-agreement device and a responding key-agreement device thus are provided, configured to generate a symmetric key shared between them. The devices are configured for generating in electronic form a private random value, obtaining in electronic form a public set of bivariate polynomials and computing a univariate polynomial by summing the univariate polynomials obtained by substituting the private random value into the polynomials of the public set. The devices are configured to send their computed univariate polynomial to the other device, and to compute or reconstruct the shared symmetric key by substituting its generated private random value in the received univariate polynomial.

Given a communications network comprising multiple network devices, it is a problem to set up secure connections between pairs of such network devices. This problem is address in C. Blundo, A. De Santis, A. Herzberg, S. Kutten, U. Vaccaro and M. Yung, "Perfectly-Secure Key distribution for Dynamic Conferences", Springer Lecture Notes in Mathematics, Vol. 740, pp. 471-486, 1993 (referred to as 'Blundo').

It assumes a central authority, also referred to as the network authority or as the Trusted Third Party (TTP), that generates a symmetric bivariate polynomial $f(x,y)$, with coefficients in the finite field F with p elements, wherein p is a prime number or a power of a prime number. Each device has an identity number in F and is provided with local key material by the TTP. For a device with identifier $\eta$, the local key material are the coefficients of the polynomial $f(\eta,y)$. If a device $\eta$ wishes to communicate with device $\eta'$, it uses its key material to generate the key $K(\eta,\eta')=f(\eta,\eta')$. As f is symmetric, the same key is generated. The local key material is secret. Knowledge of the local key material would directly compromise the system. In particular it would allow an eavesdropper to obtain the same shared key. The method requires that each device in a network of devices has its own unique identity number and local key material.

Neither the initiating key-agreement device nor the responding key-agreement device described herein needs to receive private keying material. Even if the initiating key-agreement device and the responding key-agreement device do not share a secret which may be used to encrypt communication, they can agree on a shared symmetric key. Furthermore, the initiating key-agreement device and the responding key-agreement send a univariate polynomial to the other party, rather than a single value. The initiating key-agreement device and the responding key-agreement may be configured to obtain the public set from an external server, thus reducing local processing overhead, and shifting network load. However, the public set does not allow one to determine any secret values.

Examples of initiating key-agreement devices, and responding key-agreement devices are defined in the following numbered clauses:

1. An initiating key-agreement device (100) configured to generate a symmetric key shared with a responding key-agreement device, the shared symmetric key being for symmetric encryption and/or decryption of electronic messages, the initiating key-agreement device comprising
   an initiating key data generator (110) configured for
   generating in electronic form a first private random value (112, s),
   obtaining in electronic form a public set of bivariate polynomials (122, $f_i(,)$),
   computing an initiating univariate polynomial (124) by summing the univariate polynomials obtained by substituting the first private random value (112, s) into the polynomials of the public set (122, $f_i(s,)$),
   a communication unit (330) configured for
   sending the initiating univariate polynomial (124) to the responding key-agreement device (200), and for
   receiving from the responding key-agreement device a responding univariate polynomial (222),
   a symmetric key obtainer (310) configured for
   reconstructing a shared symmetric key (312, K') by substituting the first private random value (112, s) in the responding univariate polynomial (222).

2. A responding key-agreement device (200) configured to generate a symmetric key shared with an initiating key-agreement device, the shared symmetric key being for symmetric encryption and/or decryption of electronic messages, the responding key-agreement device comprising,
   a communication unit (340) configured for
   receiving from the initiating key-agreement device an initiating univariate polynomial (124),
   a responding key data generator (220) configured for
   generating in electronic form a second private random value (212, r),
   obtaining in electronic form a public set of bivariate polynomials (122, $f_i(,)$),
   computing a responding univariate polynomial (222) by summing over univariate polynomials obtained by substituting the second private random value (r) into the polynomials of the public set (122, $f_i(r,)$), the communication unit being further configured for sending to the initiating key-agreement device the responding univariate polynomial (222), and
   a symmetric key obtainer (210) configured for computing a shared symmetric key (214, K) by substituting the second private random value (212, r) in the initiating univariate polynomial.

3. An initiating key-agreement device as in Clause 1, or a responding key-agreement device as in Clause 2, comprising an
   an encryption unit (230) configured for encrypting an electronic message with the shared symmetric key (214, 312), and/or
   a decryption unit (320) configured for decrypting an encrypted electronic message with the shared symmetric key (214, 312).

4. An initiating key-agreement device as in Clause 1, or a responding key-agreement device as in Clause 2, wherein the public set of bivariate polynomials ($f_i(,)$) only comprises symmetric bivariate polynomials.

5. An initiating key-agreement device as in Clause 1, or a responding key-agreement device as in Clause 2, wherein
   the public set of bivariate polynomials ($f_i(,)$) comprises at least two different bivariate polynomials, and/or
   at least one polynomial of the public set has a degree of at least two in one of the two variables of said at least one polynomial.

6. An initiating key-agreement device as in Clause 1, or a responding key-agreement device as in Clause 2, wherein
   the initiating univariate polynomial is represented as a list of coefficients of the initiating univariate polynomial in a canonical form, and
   the responding univariate polynomial is represented as a list of coefficients of the responding univariate polynomial in a canonical form.

7. An initiating key-agreement device as in Clause 1, or a responding key-agreement device as in Clause 2, wherein a different commutative ring is associated with each polynomial of the public set of bivariate polynomials, and wherein
   the initiating univariate polynomial univariate polynomial obtained by substituting the first private random value (s) into a particular polynomial of the public set ($f_i(s,)$) is reduced to a canonical form in the commutative ring associated with the particular univariate polynomial, and
   the responding univariate polynomial obtained by substituting the second private random value (r) into a particular polynomials of the public set ($f_i(r,)$) is reduced to a canonical form in the commutative ring associated with the particular univariate polynomial.

8. An initiating key-agreement device as in Clause 1, or a responding key-agreement device as in Clause 2, wherein
   a public global reduction integer (N) is associated with the public set and a public individual reduction integer ($q_i$) with each polynomial of the public set,
   the first private random value (s) and the second private random value (r) are integers, each polynomial in the public set is a bivariate polynomial with integer coefficients ($f_i(,)$), the initiating univariate polynomial and responding univariate polynomial are univariate polynomials with integer coefficients,
   and wherein computing the initiating univariate polynomial comprises
      obtaining a set of univariate polynomials by
         for each polynomial of the public set substituting the first private random value (s) into said polynomial ($f_i(s,)$) and reducing modulo the public individual reduction integer ($q_i$) associated with said polynomial, and
      summing the set of univariate polynomials and reducing modulo the global reduction integer (N),
   and wherein
   computing the shared symmetric key (K) comprises substituting the second private random value (r) in the initiating univariate polynomial and reducing modulo the global reduction integer (N),
   computing the responding univariate polynomial comprises
      obtaining a set of univariate polynomials by
         for each polynomial of the public set substituting the second private random value (r) into the polynomial ($f_i(r,)$) and reducing modulo the public individual reduction integer ($q_i$) associated with said polynomial, and
      summing the set of univariate polynomials and reducing modulo the global reduction integer (N), and wherein
reconstructing the symmetric key (K) comprises substituting the first private random value (s) in the responding univariate polynomial and reducing modulo the public global reduction integer (N).

9. An initiating key-agreement device as in Clause 8, or a responding key-agreement device as in Clause 8, wherein
the public global reduction integer (N) is an odd number larger than $2^{(\alpha+2)b-1}$ and/or lower than $2^{(\alpha+2)b}$, wherein $\alpha$ represents the highest degree in one of the two variables of the polynomials in the public set, and b represents a key length, and
for each public individual reduction integer ($q_i$), the public global reduction integer (N) minus said public individual reduction integer ($q_i$) is a multiple of 2 to the power of the key length ($q_i = N - \beta_i 2^b$, $1 \leq \beta_i < 2^b$) and is less than 2 to the power of twice the key length,
and wherein computing the shared symmetric key (K) further comprises reducing modulo 2 to the power of the key length ($2^b$).

10. An initiating key-agreement device as in Clause 1, or a responding key-agreement device as in Clause 2, wherein
the responding key-data generator is configured for computing key confirmation data from the symmetric key (K) for verifying if a reconstructed key (K') equals said symmetric key (K), the communication unit being further configured for sending to the initiating key-agreement device the key confirmation data,
and wherein
the symmetric key obtainer (310) of the initiating key-agreement device is configured for
deriving a first reconstructed key (K') from the result of substituting the first private random value (s) in the responding univariate polynomial and reducing modulo the public global reduction integer (N),
determining from the key confirmation data if the first reconstructed key (K') equals the symmetric key (K) and if not deriving a further reconstructed key from the first reconstructed key (K').

11. An initiating key-agreement device as in the combination of Clauses 8 and 10, wherein deriving a further reconstructed key comprises adding the public global reduction integer (N) or a multiple of the public global reduction integer (N) to the first reconstructed key (K') and reducing modulo the 2 to the power of the key length ($2^b$).

12. An initiating key-agreement device as in Clause 1, or a responding key-agreement device as in Clause 2, wherein
a public global reduction polynomial (N(t)) is associated with the public set and public individual reduction polynomials ($Q_i(t)$) with each polynomial of the public set,
the first private random value (s(t)) and the second private random value (r(t)) are polynomials, each particular polynomial ($F_i(,)$) in the public set is a bivariate polynomial with coefficients ($F_{i,j,k}(t)$) taken from the polynomial ring modulo the public individual reduction polynomial ($Q_i(t)$) associated with the particular polynomial ($F_i(,)$),
the initiating univariate polynomial and responding univariate polynomial have polynomial coefficients,
and wherein computing the initiating univariate polynomial comprises
obtaining a set of univariate polynomials by
for each particular polynomial of the public set substituting the first private random value (s(t)) into said polynomial ($F_i(s,)$) and reducing modulo the public individual reduction polynomial ($Q_i(t)$) associated with said particular polynomial, and
summing the set of univariate polynomials, and wherein
computing the symmetric key (K) comprises substituting the second private random value (r(t)) in the initiating univariate polynomial and reducing modulo the global reduction polynomial (N(t)),
computing the responding univariate polynomial comprises
obtaining a set of univariate polynomials by
for each polynomial of the public set substituting the second private random value (r(t)) into the polynomial ($F_i,r$) and reducing modulo the public individual reduction polynomial ($Q_i(t)$) associated with said polynomial, and
summing the set of univariate polynomials,
and wherein
reconstructing the symmetric key (K) comprises substituting the first private random value (s(t)) in the responding univariate polynomial and reducing modulo the public global reduction polynomial (N(t)).

13. A system for key agreement comprising an initiating key-agreement device (100) as in Clause 1 and a responding key-agreement device (200) as in Clause 2.

14. An initiating key-agreement method configured to generate a symmetric key shared with a responding key-agreement device, the shared symmetric key being for symmetric encryption and/or decryption of electronic messages, the initiating key-agreement method comprising
generating in electronic form a first private random value (s), and
obtaining in electronic form a public set of bivariate polynomials ($f_i(,)$),
computing a initiating univariate polynomial by summing over univariate polynomials obtained by substituting the first private random value (s) into the polynomials of the public set ($f_i(s,)$), and
sending the initiating univariate polynomial to the responding key-agreement device,
receiving from the responding key-agreement device a responding univariate polynomial (222),
reconstructing a shared symmetric key (312, K') by substituting the first private random value (s) in the responding univariate polynomial (222).

15. A responding key-agreement method configured to generate a symmetric key shared with an initiating key-agreement device, the shared symmetric key being for symmetric encryption and/or decryption of electronic messages, the responding key-agreement method comprising,
receiving from the initiating key-agreement device an initiating univariate polynomial,
generating in electronic form a second private random value (r), and
computing a shared symmetric key (K) by substituting the second private random value (r) in the initiating univariate polynomial,
computing a responding univariate polynomial by summing over univariate polynomials obtained by substituting the second private random value (r) into the polynomials of the public set ($f_i(r,)$), and
sending to the initiating key-agreement device the responding univariate polynomial (222).

16. A computer program comprising computer program code means adapted to perform all the steps of any one of the clauses 14, and 15 when the computer program is run on a computer.

17. A computer program as in clause 16 embodied on a computer readable medium.

BRIEF DESCRIPTION OF THE DRAWINGS

These and other aspects of the invention are apparent from and will be elucidated with reference to the embodiments described hereinafter. In the drawings.

Figure 1:
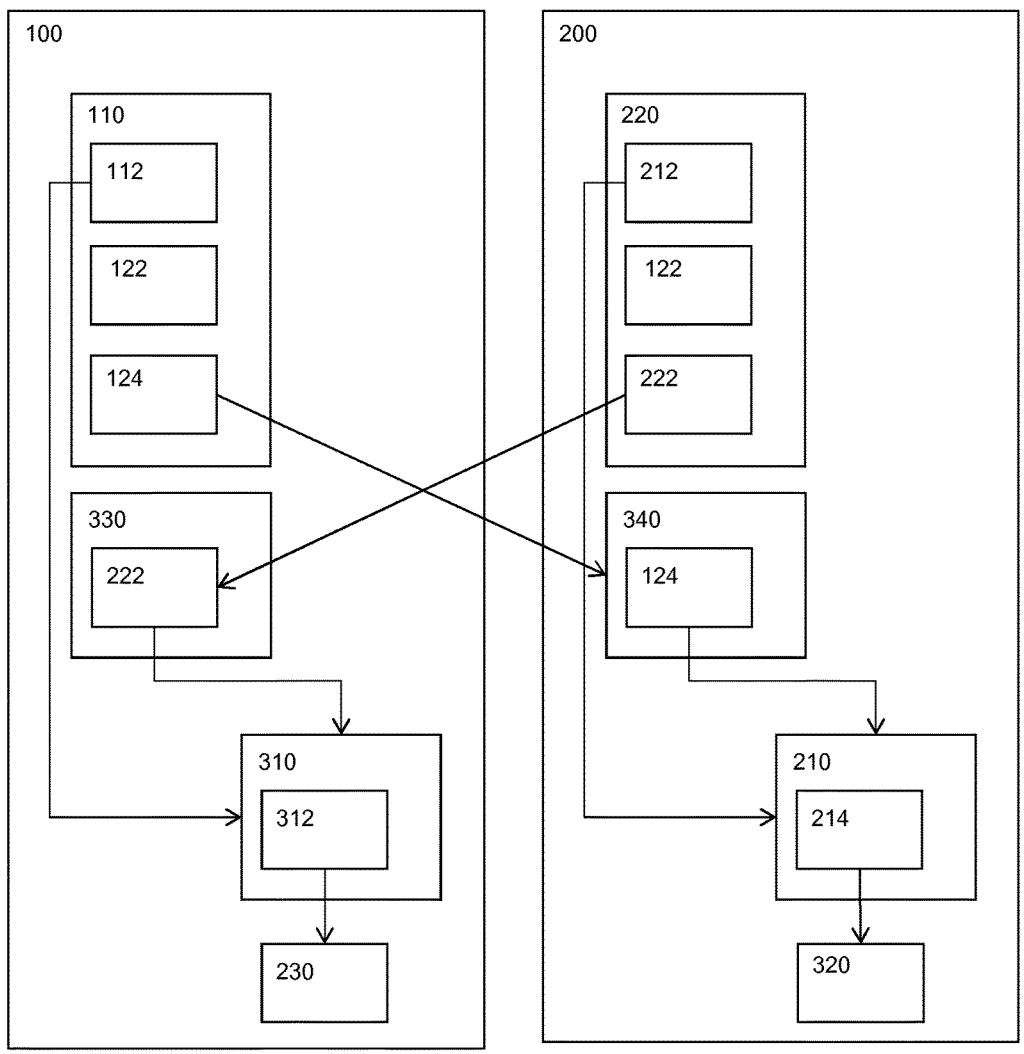
FIG. 1 is schematic block diagram of a key agreement system 400.

It should be noted that items which have the same reference numbers in different Figures, have the same structural features and the same functions, or are the same signals. Where the function and/or structure of such an item has been explained, there is no necessity for repeated explanation thereof in the detailed description.

DETAILED DESCRIPTION OF EMBODIMENTS

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described.

FIG. 1 is schematic block diagram of a key agreement system 400. System 400 comprises an initiating key-agreement device 100, and a responding key-agreement device 200. Responding key-agreement device 200 will also be referred to as responding device 200.

The initiating key-agreement device 100 is configured to generate a symmetric key shared with the responding key-agreement device. The shared symmetric key may be used for symmetric encryption and/or decryption of electronic messages, e.g. by using a block cipher, such as AES, or DES, or by using a stream cipher such as RC4. The shared symmetric key may be used for symmetric authentication, e.g., by generating and/or verifying a message authentication code, such as HMAC, or CBC-MAC, etc, using a hash or block cipher, respectively.

Initiating key-agreement device 100 comprises an initiating key data generator 110, a communication unit 330 and a symmetric key obtainer 310. Initiating key-agreement device 100 as shown in FIG. 1 also comprises an optional encryption unit 230. Instead of an encryption unit 230, initiating key-agreement device 100 could also comprise some other cryptographic unit configured for using a symmetric key.

The use of the adjectives public and private, is intended as helpful for understanding: Even with access to all public data, the private data cannot be computed, at least not without unreasonable high resources given the security of the application or compared to the resources needed for key generation, encryption and decryption. However, 'public' does not mean that the corresponding data is necessarily made available to anybody else than initiating key-agreement device 100 and responding device 200. In particular, keeping the public set 122 and other public parameters secret from untrusted parties increases security. Likewise, access to private data may be restricted to the party that generated that data, this increase security. However, a trusted party may be allowed access to the private data; Access to private data compromises security.

Initiating key data generator 110 is configured to generating in electronic form a first private random value 112, which is also referred to as 's'. Private random value 112 is random in the sense that its predictability for an attacker is less than a predetermined security bound. For example, private random value 112 may be selected by initiating key-agreement device 100 using a random number generator comprised in initiating key-agreement device 100 (not separately shown). The random number generator may be a true random number generator or a pseudorandom number generator. Initiating key data generator 110 stores first private random value 112 in storage, say an electronic memory. System 430 is suited for the generation of ephemeral key(s), in that case the storage may be a temporal storage, say a volatile memory, such as RAM.

Initiating key data generator 110 is configured to obtain in electronic form a public set of bivariate polynomials 122, also referred to as $f_i(,)$ in formulas. The embodiment described below assumes that all bivariate polynomials in set 122 are symmetric. Using symmetric polynomials brings a number of advantages. First of all they require fewer coefficients to specify, and thus use fewer resources. Second, they simplify bookkeeping; with a non-symmetric polynomial key generation and decryption uses a first of two variables of the polynomials for substitution, whereas encryption uses a second of two variables of the polynomials for substitution.

The symmetric bivariate polynomial may also be notated as $f_i(x,y)$ with two formal variables as placeholder. A symmetric bivariate polynomial satisfies $f_i(x,y)=f_i(y,x)$. This requirement translates to a requirement on the coefficients, e.g., that the coefficient of a monomial $x^a y^b$ equals the coefficient of a monomial $x^b y^a$.

Public set 122 may be obtained in a number of ways. For example, public set 122 may be prescribed, e.g., by a standard determining the encryption to be used in initiating key-agreement device 100. In that case, shared keys of agreed between different devices only differ because they were generated using a different private random values. Using a fixed public set 122 reduces communication and/or storage overhead at initiating key-agreement device 100 and responding key-agreement device 200.

Using different public sets 122 for different devices 100 and 200 increases security. For example, public set 122 may be generated randomly by computing random values for the coefficients of the polynomials in public set 122. It is convenient to prescribe some aspects of public set 122, such as the number of polynomials in public set 122 and the degrees of the polynomials, or the maximum degrees. It may also be prescribed that some of coefficients in the polynomials are zero, e.g., for reducing storage requirements.

The number of polynomials in public set 122 may be chosen differently depending on the application. Public set 122 comprises at least one symmetric bivariate polynomial. In an embodiment of initiating key-agreement device 100 the public set 122 consists of one polynomial. Having only one polynomial in public set 122 reduces complexity, storage requirements and increases speed. However, having only one polynomial in public set 122 is considered less secure than having two or more polynomials in public set 122 because such a one-polynomial system does not profit from additional mixing in the summation described below. However, key generation, encryption and decryption will work correctly and are considered sufficiently secure for low-value and/or low-security applications.

In the remainder, we will assume that public set 122 comprises at least two symmetric bivariate polynomials. In an embodiment, at least two, or even all of the polynomials are different; this complicates analysis of the system considerably. It is not necessary though, public set 122 may comprise two equal polynomials and still benefit from mixing in the summation step if these two polynomials are evaluated over different rings; this point will be discussed further below. In an embodiment, public set 122 comprises at least two equal polynomials associated with different rings. Having two or more equal polynomials reduces storage requirements.

The polynomials in public set 122 may be of different degrees. With the degree of a symmetric bivariate polynomial we will mean the degree of the polynomial in one of the two variables. For example, the degree of $x^2y^2+2xy+1$ equals 2 because the degree in x is 2. Because the polynomials in public set 122 are symmetric the degree will be the same in the other variable.

The degrees of polynomials in public set 122 may be chosen differently depending on the application. Public set 122 comprises at least one symmetric bivariate polynomial of degree 1 or higher. In an embodiment, public set 122 comprises only polynomials of degree 1. Having only linear polynomials in public set 122 reduces complexity, storage requirements and increases speed. However, having only degree one polynomials in public set 122 is considered less secure than having at least one polynomial of degree at least two in public set 122 because such a system is considerably less linear. Note however, that if multiple polynomials in public set 122 are evaluated over different rings, then the resulting encryption is not linear even if all polynomials in public set 122 are. In an embodiment, public set 122 comprises at least one, preferably two, polynomials of degree 2 or higher. However, key generation, encryption and decryption will work correctly if only degree 1 polynomials are used and are considered sufficiently secure for low-value and/or low-security applications.

Having one or more polynomials in public set 122 with degree 0 will not impact the system, so long as the polynomial(s) with higher degree provide sufficient security.

For a mid-security application, public set 122 may comprise, or even consist of, two symmetric bivariate polynomials of degree 2. For a higher security application, public set 122 may comprise or even consist of two symmetric bivariate polynomials, one of degree 2 and one of degree higher than 2, say 3. Increasing the number of polynomials and/or their degrees will further increase security at the cost of increased resource consumption.

Generally speaking there are three sources for initiating key-agreement device 100 and responding key-agreement device 200 to obtain public set of bivariate polynomials 122. The first possibility is that initiating key-agreement device 100 and responding key-agreement device 200 have public set of bivariate polynomials 122 pre-stored. For example, initiating key-agreement device 100 and responding key-agreement device 200 may be two devices from a larger set of devices, each of which has public set of bivariate polynomials 122 stored, to enable key agreement. This option is lower in security but is also low in complexity. The second option is that one of initiating key-agreement device 100 and responding key-agreement device 200 computes public set of bivariate polynomials 122 and send it to the other of initiating key-agreement device 100 and responding key-agreement device 200. If initiating key-agreement device 100 computes public set of bivariate polynomials 122, he may send it together with his first message (described below) thus reducing the number of messages exchanged between initiating key-agreement device 100 and responding key-agreement device 200. The third option is that both initiating key-agreement device 100 and responding key-agreement device 200 obtain public set of bivariate polynomials 122 from an external source, say key agreement server 450, e.g., a so-called trusted third party (TTP). Even though public set of bivariate polynomials 122 is public, i.e., knowledge of public set of bivariate polynomials 122 does not enable one to obtain the shared symmetric key, one of initiating key-agreement device 100 and responding key-agreement device 200 may doubt that the other party has access to sufficient randomness to generate public set of bivariate polynomials 122. Furthermore, using key agreement server 450 allows one to obtain public set of bivariate polynomials 122 before it is needed, e.g., when network load is low. FIG. 1 shows the second option, i.e., without key agreement server 450. Generation of public set of bivariate polynomials 122 is not separately shown in FIG. 1.

Initiating key-agreement device 100 and responding key-agreement device 200 may need public data in addition to public set of bivariate polynomials 122, e.g., a global modulus, etc, more information regarding this is provided below. Initiating key-agreement device 100 and responding key-agreement device 200 may obtain this information from the same source that they obtained public set of bivariate polynomials 122 from.

Figure 2A:
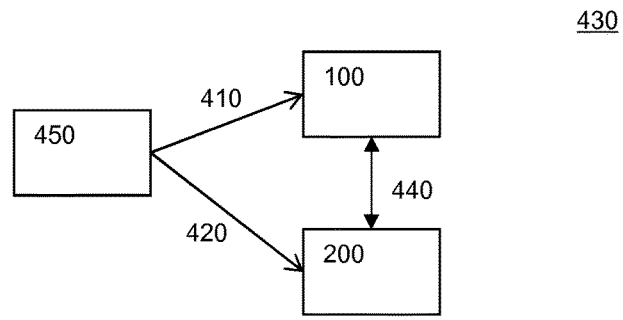
FIG. 2a is schematic block diagram of a key agreement system 430.

FIG. 2a shows an embodiment of system 430, the third option, i.e., with key agreement server 450. System 430 comprises initiating key-agreement device 100, responding key-agreement device 200 and key agreement server 450. Initiating key-agreement device 100 and responding key-agreement device 200 are configured to obtain public set of bivariate polynomials 122 by receiving it from key agreement server 450. Key agreement server 450 is configured to send a first electronic message 410 containing a public set of bivariate polynomials to initiating key-agreement device 100 and to send a second electronic message 420 containing the same public set of bivariate polynomials to responding key-agreement device 200. Both in system 400 and 430, after initiating key-agreement device 100 and responding key-agreement device 200 have obtained a shared key they may use it for a variety of cryptographic purposes, such as encrypted and/or authenticated electronic communication 440.

Figure 2B:
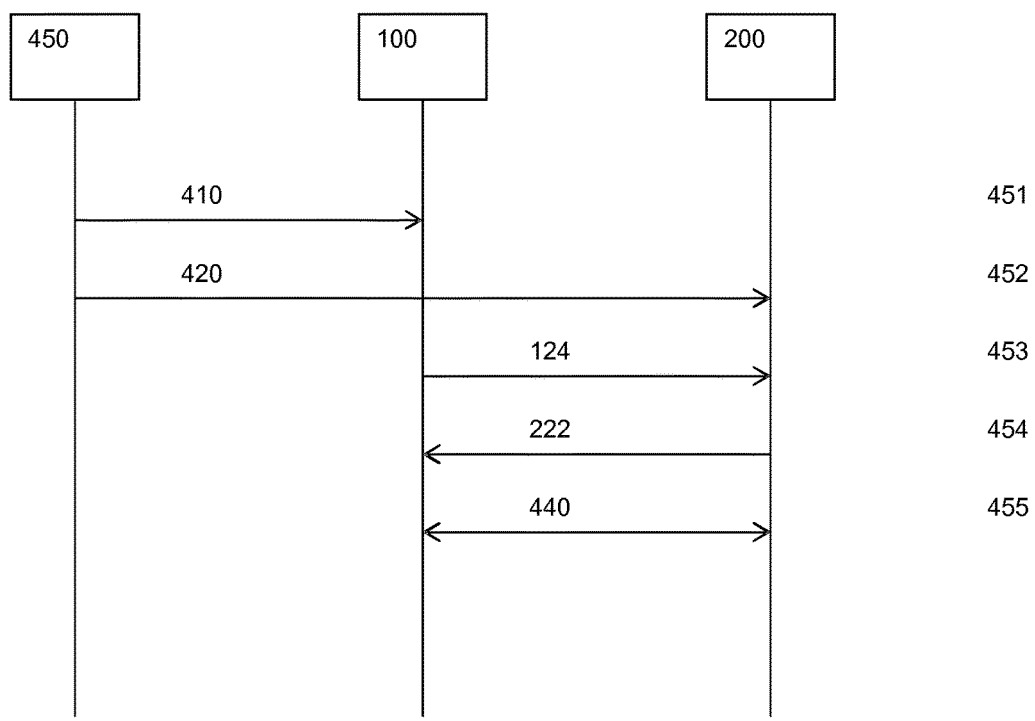
FIG. 2b shows a sequence diagram indicating the messages exchanged between key agreement server 450, initiating key-agreement device and responding key-agreement device 200.

FIG. 2b shows a sequence diagram indicating the messages exchanged between key agreement server 450, initiating key-agreement device 100 and responding key-agreement device 200. FIG. 2b also applies to a system without key agreement server 450; in that case messages 451 and 452 are omitted, and for example, message 453 contains public set of bivariate polynomials 122. In FIG. 2b, time increases downwards. Indicated at 451 and 452, key agreement server 450 sends first message 410 and second message 420. Next, initiating key-agreement device 100 sends initiating univariate polynomial 124 at 453. At 454, responding key-agreement device 200 responds by sending a responding univariate polynomial 222 of its own, possibly accompanied with a key confirmation messages. At 455, initiating key-agreement device 100 and responding key-agreement device 200 engage in encrypted and/or authenticated electronic communication using the shared key.

Continuing with FIG. 1; Initiating key data generator 110 is configured to compute a initiating univariate polynomial 124 by summing over univariate polynomials obtained by substituting first private random value 112 into the polynomials of public set 122. For example, initiating key data generator 110 may substitute first private random value 112 into each one of the symmetric polynomials in public set 122 and reduce the result. By substituting a particular value, such as first private value 112, into one of the two variables of a symmetric bivariate polynomial, but not substituting a particular value for the other variable, one of the variables is removed and a univariate polynomial is obtained.

After the substitutions in public set 122, bringing the results into a canonical form is advisable. For example, within initiating key-agreement device 100 and responding key-agreement device 200, and throughout key agreement systems 400, 430 in general, a canonical form for univariate polynomials may be used. A good choice is to write the result of the substitution as a list of coefficients ordered by degree of the monomials, e.g., as an array. If values have multiple representations, a canonical choice is preferably made for the coefficients as well.

One method for obtaining initiating univariate polynomial 124 is as follows.
1. for each polynomial in public set 122:
  a. substitute first private random value 112 into the polynomial for one of the two variables
  b. bring the result into canonical form and reduce in a ring associated with the polynomial, thus obtaining a univariate polynomial
2. sum all the univariate polynomials obtained in 1b in a further ring to obtain initiating univariate polynomial 124

These steps may be combined to a large extent.

Also initiating univariate polynomial 124 may be represented as a list of coefficients according to a canonical form. A suitable form for many applications is to list the coefficients in an array ordered by the degree of the monomial associated with the coefficient. That is, a univariate polynomial may be regarded as a sum of monomials having a coefficient associated with the monomial. Again, examples including possible formulas are provided below.

Communication unit 330 is configured for sending the initiating univariate polynomial 124 to the responding key-agreement device 200. Responding key-agreement device 200 comprises a communication unit 340 configured to receive initiating univariate polynomial 124.

Communication unit 330 is configured to send to and receive from communication unit 340; Communication unit 330 is configured to receive from and send to communication unit 330. The communication may be direct or indirect. A wide variety of electronic communication units are suitable. For example communication unit 330 and/or communication unit 340 may be a wireless unit, say a Wi-Fi, NFC or Bluetooth unit. For example, communication unit 330 and/or communication unit 340 may wired, e.g., using Ethernet.

Communication unit 330 is configured to receive a message from responding key data generator 220, the responding univariate polynomial 222, which initiating key-agreement device 100 will use to obtain the shared symmetric key. Further description of initiating key-agreement device 100 will be postponed until responding key-agreement device 200 has been described to improve readability.

Responding key-agreement device 200 is configured to generate a symmetric key shared with initiating key-agreement device 100. We assume that communication between initiating key-agreement device 100 and responding key-agreement device 200 was initiated by initiating key-agreement device 100, e.g. by sending the message containing initiating univariate polynomial 124. However, because responding key-agreement device 200 may be a less resource intensive device, responding key-agreement device 200 may send a request message first, which causes initiating key-agreement device 100 to start the protocol, i.e., to send message 453.

Responding key-agreement device 200 comprises communication unit 340 which is configured to receive initiating univariate polynomial 124 generated by initiating key-agreement device 100.

Responding key-agreement device 200 comprises responding key data generator 220. Responding key data generator 220 may be the same type of device as initiating key data generator 110. That is responding key data generator 220 is configured for generating in electronic form a second private random value 212, referred to a 'r'; obtaining in electronic form the public set of bivariate polynomials 122, $f_i$; and computing a responding univariate polynomial 222 by summing over univariate polynomials obtained by substituting the second private random value r into the polynomials of the public set 122, $f(,r,)$.

A difference between responding key data generator 220 and initiating key data generator 110 is that responding key data generator 220 could obtain public set of bivariate polynomials 122 by receiving it from initiating key-agreement device 100. Initiating key-agreement device 100 could then obtain public set of bivariate polynomials 122 by generating it himself or obtaining it from yet another source, say key agreement server 450.

Computing a responding univariate polynomial 222 by responding key data generator 220 may use the same implementation as computing initiating univariate polynomial 124 apart from using second private random value 212 instead of private random value 112.

Responding key data generator 220 may represent the responding univariate polynomial as a list of coefficients of the responding univariate polynomial in a canonical form. The same type of canonical form used for initiating univariate polynomial 124 may be used for responding univariate polynomial 222. In particular, responding univariate polynomial 222 may be represented as a list of the coefficients of the monomials of responding univariate polynomial 222 sorted by degree of the polynomials. Responding univariate polynomial 222 or initiating univariate polynomial 124 may also be represented as a list of pairs, each pair comprising a coefficient of a monomials and a degree. In this representation, monomials with a zero coefficient need not be represented. The latter representation is also suited for sparse polynomials in public set 122.

Communication unit 340 is configured to send the responding univariate polynomial 222 to initiating key-agreement device 100 in response to the message received from initiating key-agreement device 100.

Responding key-agreement device 200 comprises a symmetric key obtainer 210 configured for computing a shared symmetric key 214, K by substituting the second private random value 212, r in the initiating univariate polynomial. Second private random value 212 is also referred to as r. Second private random value 212 is random in the sense that its predictability for an attacker of the encrypted message is less than a security bound. A different second private random value 212 is preferably used for each new shared key generated; this is not strictly necessary; as long as one party of initiating key-agreement device 100 and responding key-agreement device 200 uses a new random number, a new shared key will result. Symmetric key obtainer 210 is configured to obtain a symmetric key 214 by substituting the second private random value 212 in initiating univariate polynomial 124 received through communication unit 340 from initiating key-agreement device 100. Symmetric key 214 is also referred to as K. The substitution may be evaluated in a ring.

Second private random value 212 is secret, i.e., at least secret for parties not trusted with the contents of communication encrypted with key 214. Initiating key-agreement device 100 does not need access to second private random value 212. In an embodiment of responding device 200, second private random value 212 is deleted after generating key 214 and responding univariate polynomial 222, e.g., immediately after their generation.

Obtaining symmetric key 214 may involve further steps as well after the substitution. For example, a hash function may be applied before obtaining symmetric key 214, e.g., applied to the result of substituting the second private random value 212, r in the initiating univariate polynomial and reduction steps. This smooths the entropy in symmetric key 214 and may improve security, for example if the distribution of second private random value 212 is not uniform, or known to be uniform. Also, symmetric key 214 may be truncated to a key length. For example, one may take the b least significant bits of the result of the substitution and truncate.

Responding device 200, say symmetric key obtainer 210, may be configured to compute key confirmation data from symmetric key 214 (K) for verifying if a reconstructed symmetric key 312 (K') reconstructed by initiating key-agreement device 100 equals symmetric key 214. Key confirmation data can take various forms. For example, the key confirmation data may be a cryptographic hash, say sha-256, over symmetric key 214. To verify if reconstructed key 312 equals symmetric key 214, initiating key-agreement device 100 may compute the hash over reconstructed symmetric key 312 and verify if the hashes are the same. Key confirmation data may also comprise an encryption over an input. To verify if reconstructed symmetric key 312 equals symmetric key 214, initiating key-agreement device 100 may encrypt the input with reconstructed symmetric key 312 and verify if the encryptions are the same, or decrypt the current input and verify if it equals the input. The input may be part of the key confirmation data, for example the input may be a nonce or even random. The input may also be fixed, in the latter case the input need not be part of the key confirmation data.

Communication unit 340 is configured to send responding univariate polynomial 222 to initiating key-agreement device 100, and may in addition send key confirmation data to initiating key-agreement device 100. For some choices of parameters, key confirmation data is needed if it is necessary that a shared key will be correctly generated.

Responding key-agreement device 200 comprises the optional decryption unit 320. Decryption unit 320 is configured to decrypt encrypted messages which initiating key-agreement device 100 encrypted using reconstructed symmetric key 312. Decryption unit 320 is configured to use a decryption algorithm that corresponds to the encryption algorithm used by encryption unit 230. For example, the message is encrypted using AES, then decryption unit 320 will decrypt using AES. The encryption and decryption algorithm to use may be fixed. For example, responding device 200 and initiating key-agreement device 100 may be configured to always use AES. But the encryption/decryption algorithm to use may also be configurable. Responding key-agreement device 200 may comprise other or additional cryptographic units than decryption unit 320, using symmetric key 214. Responding key-agreement device 200 may use 214 for encrypted and/or authenticated electronic communication 440.

Continuing with initiating key-agreement device 100; communication unit 330 is configured to receive responding univariate polynomial 222 and possibly key confirmation data from responding key-agreement device 200. Symmetric key obtainer 310 is configured to obtain a reconstructed symmetric key 312. Reconstructed symmetric key 312 is a reconstruction based on responding univariate polynomial 222 of the symmetric key 214 obtained by symmetric key obtainer 210.

Symmetric key obtainer 310 is configured to reconstruct reconstructed symmetric key 312 by substituting first private random value 112 (s) in responding univariate polynomial 222. This step will likely produce the same encryption key. Unfortunately, it is not guaranteed that symmetric key 214 will be directly obtained from substituting first private random value 112 in responding univariate polynomial 222. The likelihood of this depends on the number of polynomials in public set 122, their degrees and the underlying rings. The likelihood may be computed by substituting first private random value 112 in a general formula representing public set 122, and calculating the likelihood of carries that distort the reconstructed key 312 and symmetric key 214 being the same.

Depending on said likelihood and the application, the importance of key confirmation data differs. Some applications may accept that, by chance, initiating key-agreement device 100 and responding key-agreement device 200 may not end up with the same key, and thus may not be able to decrypt each other's messages. If needed, initiating key-agreement device 100 could request responding device 200 to send a new public set of bivariate polynomials 122, but obtained with a different second private random value 212.

However, it is also possible for initiating key-agreement device 100 to construct multiple keys, and determine reconstructed symmetric key 312 from the multiple keys, by verifying the multiple keys using the key confirmation data. At most one key from the multiple keys can be correctly verified using the key confirmation data.

The number of constructed keys and the choices made for the system, in particular for public set 122 and the underlying ring, influence the probability of initiating key-agreement device 100 failing to construct a key equal to symmetric key 214. We will show below, that the probability may be reduced to zero, if required.

Generating the multiple constructed keys is preferably done iteratively. For example, symmetric key obtainer 310 may be configured for a key search as follows:
1. deriving a first reconstructed key (K') from the result of substituting the private random value (s) in the responding univariate polynomial,
2. Determining from the key confirmation data if the first reconstructed key (K') equals symmetric key 214 (K).
3. If equal terminate the key search
4. Generate a further reconstructed key the first reconstructed key (K').
5. Goto step 2.

Implementation of this key search may be done using a variety of programming means, such as for-next loops, while loops, do-until, and the like. Step 3 may terminate in case of a time-out as well.

Interestingly, neither symmetric key obtainer 210 nor symmetric key obtainer 310 need access to public set 122 for creating keys 214 and 312. This means that initiating key-agreement device 100 may discard, e.g., delete, public set of bivariate polynomials 122 after generating initiating univariate polynomial 124. Responding key-agreement device 200 may discard public set of bivariate polynomials 122 after generating responding univariate polynomial 222. The deletion may be done before symmetric key obtainer 310 and/or symmetric key obtainer 210 generate key 312, 214 respectively.

Encryption unit 230 may be configured to encrypt a message with reconstructed symmetric key 312 to obtain an encrypted message. Encryption unit 230 may be configured with any symmetric encryption algorithm. For example, encryption unit 230 may use a block cipher such as AES, CAST etc, using a suitable 'mode of operation' for encryption, such as CBC or CTR. If the plain message is known to have a bit size less than or equal that of symmetric key 214 then encryption unit 230 or decryption unit 320 may add or XOR symmetric key 214 with the message to encryption or decrypt it. Other cryptographic units may be used instead or in addition to encryption unit 230, such as authentication/verification and decryption units.

Responding key-agreement device 200 is like initiating key-agreement device 100, but with two important differences: the key generation part of responding key-agreement device 200 is simpler. responding key-agreement device 200 does not need to account for the possibility that the generated key may not be the equal to the key generated at initiating key-agreement device 100; furthermore initiating key-agreement device 100 computes initiating univariate polynomial 124 before communicating with responding key-agreement device 200 and computes reconstructed symmetric key 312 after, whereas responding key-agreement device 200 computes responding univariate polynomial 222 and initiating univariate polynomial 124 in between receiving form and sending to initiating key-agreement device 100.

Initiating key-agreement device 100 and responding device 200 are typically different devices, possibly geographically distributed. Responding device 200 and initiating key-agreement device 100 may communicate with each other over a communications network, e.g., the Internet. Initiating key-agreement device 100 and responding key-agreement device 200 may use a communications network to distribute initiating univariate polynomial 124, responding univariate polynomial 222 and/or public set of bivariate polynomials 122, but may also use, say a wired connection, transportation using a portable memory device such as a USB stick, and the like.

Interestingly, the computation system underlying the computation of first private random value 112, initiating univariate polynomial 124, symmetric key 214, responding univariate polynomial 222 and reconstructed symmetric key 312 may be chosen in a number of ways. For example, the coefficients of the bivariate and univariate polynomials, and the values, including first private random value 112, and second private random value 212, may be chosen from a so-called commutative ring. A commutative ring is a mathematical concept in which a set of values is combined with an addition and a multiplication.

In case public set 122 comprises multiple polynomials, it is was an insight of the inventor that both an improved mixing effect and one-way-ness is obtained by associating a different commutative ring with each polynomial of public set 122. Initiating key data generator 110 and responding key data generator 220 are configured to substitute private random value 112 or second private random value 212 respectively into each of the polynomials of public set 122 and reducing each polynomial in the ring associated therewith. Preferably, each polynomial is also brought into canonical form.

In formula form generation of initiating univariate polynomial 124 and responding univariate polynomial 222 may be represented as $\Sigma_i [f_i(s,)]_{R_i}$ or $\Sigma_i [f_i(r,)]_{R_i}$ for private random value 112 or second private random value 212 respectively. In these formula's, a polynomial $f_i(,)$ is associated with ring $R_i$. The square bracket indicates a reduction to canonical form in the indicated ring. The summation itself may take place in a global ring $R_0$ (not shown in the formula). Also computing symmetric key 214 and reconstructed symmetric key 312 may be performed in the global ring; possibly followed by additional processing such as truncating to key length (b) (in bits). For each local ring associated with a polynomial of the public set 122, there may be a mapping function for mapping elements of the ring to the global ring prior to summation. In many embodiments, the mapping is the natural mapping: the bit-pattern used to represent a value in the local ring is mapped to the value of the global ring having the same bit-pattern; in other words no actual computation action needs be performed to do the mapping. Applying a reduction is also referred to as a 'reduction function'.

A ring used as one of the rings associated with the polynomials in the public sets 122, or as the global ring is implemented, say in system 400, as follows. Values of the ring are represented in digital form in electronic devices 100, and 200, and the addition and multiplication operations on the values are implemented as a digital algorithm. The algorithms may be implemented in software or in hardware. Hardware representation of these operations is often used, possibly in combination with software. A ring may have a canonicalization algorithm for representing a value of the ring in a unique form.

There are many commutative rings that may be represented in digital form. Two important examples are polynomial rings and integer rings. Below we give a worked example based on integer rings, in which each $R_i$ is chosen as $\mathbb{Z}_{q_i}$, i.e., the commutative ring of integers modulo $q_i$, and $R_0$ as $\mathbb{Z}_N$, i.e., the commutative ring of integers modulo N. These rings allow digital representation of their values as digitally represented integers, e.g., as integers from 0 to $q_i-1$ or to N−1, respectively. Polynomials may be represented as an array of values represented in this form. An addition algorithm may be implemented as a hardware implementation of integer addition followed by a software implementation of reduction modulo the modulus. Multiplication may be implemented as a hardware implementation of integer multiplication followed by a software implementation of reduction modulo the modulus. Many commutative rings and digital representation are known in the art, per se. Application of such digital representations to obtain a key agreement system in the manner described herein, is not.

In an embodiment of key agreement system 400, a public global reduction integer (N) is associated with the public set and a public individual reduction integer ($q_i$) with each polynomial of the public set. The associated information may be included in public set 122 or may be fixed. In an embodiment, the public global reduction integer is fixed, and need not be included in the public set, but the public individual reduction integers ($q_i$) are not fixed and may be generated together with public set 122. These numbers may be chosen randomly, in dependence upon security requirements, likelihood of correct decryption and the like. Below possible choices for these numbers are given. At least two of the public individual reduction integers are different, preferably all public individual reduction integers are different.

In this embodiment, initiating key data generator 110 is configured to generate private random value 112 as an integer between 0 and the global public global reduction integer (N). Responding key data generator 220 is configured to generate second private random value 212 as an integer between 0 and the global public global reduction integer (N).

In this embodiment, initiating key data generator 110 is configured to obtain the polynomials in public set 122 as a symmetric bivariate polynomial with integer coefficients ($f_i(,)$). It is not required that the polynomials in public set 122 have coefficients that are reduced modulo the associated public reduction integer, for example the coefficients could be larger or negative. However, it is convenient for implementations that the polynomials of public set 122 are in canonical form, say with coefficients between 0 and the associated public reduction integer ($q_i$) minus 1 (inclusive).

In this embodiment, Initiating key data generator 110 is configured to generate the initiating univariate polynomial 124 as a univariate polynomial with integer coefficients. Responding key data generator 220 is configured to generate responding univariate polynomial 222 as a univariate polynomial with integer coefficients.

For example, initiating key data generator 110 may be configured to generate the initiating univariate polynomial by 1. obtaining a set of univariate polynomials by
2. for each polynomial of the public set
   a. substituting the private random integer (s) into said polynomial ($f_i(s,)$) and reducing modulo the public individual reduction integer ($q_i$) associated with said polynomial, and
3. summing the set of univariate polynomials and reducing modulo the global reduction integer (N), Configuring responding key data generator 220 to generate the responding univariate polynomial 222 may be done the same, except to use second private random value 212 instead of private random value 112.

Symmetric key obtainer 210 is configured to compute the symmetric key (K) by substituting the second private random value (r) in the initiating univariate polynomial and reducing modulo the global reduction integer (N), taking the least key length number (b) of bits of the result.

As an example, the public global reduction integer (N) may be chosen as an odd number larger than $2^{(\alpha+1)b-1}$ and/or lower than $2^{(\alpha+2)b}$, wherein $\alpha$ represents the highest degree in one of the two variables of the polynomials in the public set, and b represents a key length. For each public individual reduction integer ($q_i$), the public global reduction integer (N) minus said public individual reduction integer ($q_i$) is a multiple of 2 to the power of the key length ($q_i=N-\beta_i 2^b$, $1 \leq \beta_i < 2^b$) and is less than 2 to the power of twice the key length. This particular choice of parameters is a trade-off between adequate mixing and a high probability the de decryption device can reconstruct the key. Other choices are possible.

In this case, computing the symmetric key 214 (K) further comprises reducing modulo 2 to the power of the key length ($2^b$), i.e., truncating to take only the final b bits of the substitution result.

Symmetric key obtainer 310 may be configured to reconstruct the symmetric key (K) by substituting the private random value 112 (s) in the responding univariate polynomial and reducing modulo the public global reduction integer (N) and reducing modulo 2 to the power of the key length ($2^b$).

In this embodiment, it is possible that the key obtained from only the substitution step in symmetric key obtainer 310 is not yet equal to symmetric key 214. Detecting whether or not the reconstructed key equals the key used for encryption may use key confirmation data obtained from responding key-agreement device 200. Key confirmation may also be implicit, e.g., a message may be received in a particular form, which is not obtained when decrypting with a different key.

If the key confirmation data for the key K (e.g., H(K) is different from H(K') for a hash function H), initiating key-agreement device 100 may still obtain the correct key. To do so, symmetric key obtainer 310 calculates, from K' the values $<K'+j\ N>_{2^b}$ for a range of j and the key confirmation values thereof (e.g. hash values). At most one of these key confirmation values equals to the key confirmation value, e.g. hash value H(K). If that index j is found symmetric key obtainer 310 uses that value of j and calculates K as $<K'+j\ N>_{2^b}$, with angle brackets denoting a modulo operation. If such a j is not found, then initiating key-agreement device 100 cannot decrypt the data. In the latter case, initiating key-agreement device 100 has several options, e.g., generate an error message, request a new public set of bivariate polynomials 122 generated from a different second private random value 212, etc. Interestingly, the private random value 112 is needed only to compute the initial K', the other computations use the public global reduction integer (N).

The following algorithm may be used. Symmetric key obtainer 310 may be configured for a key search as follows:

1. deriving a first reconstructed key (K') from the result of substituting the private random integer (s) in the responding univariate polynomial,
2. Determining from the key confirmation data if the first reconstructed key (K') equals symmetric key 214 (K).
3. If equal terminate the key search
4. Generate a further reconstructed key the first reconstructed key (K', by calculating $<K'+j\ N>_{2^b}$, for a new non-zero value of j.
5. Goto step 2.

Step 3 may also terminate in case of a time-out. For example, on some resource-constrained devices the amount of time that may be spend on key reconstruction is limited.

Typically, the devices 100, and 200 each comprise a microprocessor (not shown) which executes appropriate software stored at the device, e.g. which software may have been downloaded and stored in a corresponding memory, e.g. RAM (not shown) or ROM, of the device.

Below a mathematical description is given of an embodiment of the system. First security parameters are chosen: a bit-length b, a number of polynomials in the public set m, and a maximum degree in the public set $\alpha$. The bit-length b determines the key length in the symmetric encryption. Increasing the other two parameters, increases the complexity of the system. These three parameters may be fixed, e.g., determined by a system architect, or may be selected by initiating key-agreement device 100. Furthermore, initiating key-agreement device 100 chooses an odd number N in the interval $(2^{(\alpha+1)b-1}, 2^{(\alpha+2)b}$, m integers $q_i$, $1 \leq i \leq m$ of the form $q_i = N - \beta_i 2^b$ with integer $\beta_i$ satisfying $1 \leq \beta_i < 2^b$ and m symmetric bivariate polynomials of degree $\alpha$:

$$f_i(x, y) = \sum_{j=0}^{a} \sum_{k=0}^{a} (f_i)_{jk} x^j y^k \text{ with } (f_i)_{jk} = (f_i)_{kj} \text{ and } 0 \leq (f_i)_{jk} < q_i.$$

Because of symmetry, only those $(f_i)_{jk}$ with $j \leq k$ need to be specified. Initiating key-agreement device 100 chooses a secret private integer s (112) in the range $1 \leq s < 2^b$ and calculates the public univariate polynomial 125 by calculating $(\alpha+1)$ numbers $$a_k = \left\langle \sum_{i=1}^{m} \left\langle \sum_{j=0}^{a} (f_i)_{jk} s^j \right\rangle_{q_i} \right\rangle_N \text{ for } 0 \leq k \leq \alpha.$$

All the above parameters generated by initiating key-agreement device 100 are public data, except for s, are public data and may be communicated to responding key-agreement device 200. In this particular embodiment, initiating key-agreement device 100 also specifies a hash function H. Responding device 200 chooses a random integer r in the in the range $1 \leq r < 2^b$ and calculates the responding univariate polynomial 222 by calculating $(\alpha+1)$ numbers $$b_k = \left\langle \sum_{i=1}^{m} \left\langle \sum_{j=0}^{a} (f_i)_{jk} r^j \right\rangle_{q_i} \right\rangle_N \text{ for } 0 \leq k \leq \alpha,$$

as well as the number $$K = \left\langle \left\langle \sum_{k=0}^{a} a_k r^k \right\rangle_N \right\rangle_{2^b}$$

and a key confirmation data, such as the hash of K, H(K). Responding device 200 transmits the $b_k$, as well as H(K). Responding key-agreement device 200 may send responding univariate polynomial 222 together with a message (M) encrypted with symmetric key 214, e.g., the number $C = \langle M+K \rangle_{2^b}$, where M is the b-bit plaintext message which is to be sent from responding key-agreement device 200 to initiating key-agreement device 100. Instead of adding K, responding device 200 may also use other encryption algorithms to obtain C by encrypting M with K, e.g., using a block cipher. Initiating key-agreement device 100 calculates $$K' = \left\langle \left\langle \sum_{k=0}^{a} b_k s^k \right\rangle_N \right\rangle_{2^b},$$

and the hash values $H = H(\langle K' + jN \rangle_{2^b})$ for $-(3m+\alpha+1) \leq j \leq (3m+\alpha+1)$.

Initiating key-agreement device 100 finds j' such that $H_{j'} = H(K)$ and retrieves K as $\langle K' + j'N \rangle_{2^b}$. Initiating key-agreement device 100 now retrieves the transmitted message M as $M = \langle C-K \rangle_{2^b}$. Instead of subtracting K, initiating key-agreement device 100 may also use other decryption algorithms corresponding to the encryption algorithms to obtain M by decryption of M with K.

The security of the scheme depends on the difficulty of finding s, given the coefficients $a_k$ and $(f_i)_{jk}$. For $m>1$ and $\alpha>1$ the only known way to do this is to try all possible values of s, which is unfeasible if b is large enough. A value of b=128 or more is so large that trying all possible values of s is unfeasible, i.e., brute force attacks are ruled out. However, some applications do not require absolute unfeasibility. In that case, values of b=48 or more may already be sufficient.

For m=1, the coefficients $a_k$ are polynomial in s in the ring $Z_{q_i}$. Such a system may possibly be attacked by adapting root finding algorithms. Although this certainly is not an easy task, for all security applications it is recommended to choose $m>1$. However, $m=1$ will produce a working system, which may be used, say, for low-value systems wherein security must be traded-off against resource use.

Specification of b, m, $\alpha$ and the hash function may not be needed, e.g., if they are fixed in a system.

In the above embodiment, adding the K and M has been used as the encryption. This is a suitable choice, for example, if the system is applied to relatively short messages such as command messages. This construction may also be used to encrypt a second symmetric key, which in turn is used to encrypt M. The above construction may also be used with other symmetric encryption, say a block cipher, such as AES, say AES-128. The above description may be varied in a number of ways. A number of possible variations are described below.

For example, the size of the public set and initiating and responding univariate polynomial may be reduced considerably if we require that all polynomial coefficients $(f_i)_{jk}$ be zero, except when $j=k=\alpha$. This reduces the size of public set of bivariate polynomials 122, but more importantly, it implies that responding device 200 only needs to transmit a single $b_k$, namely $b_\alpha$, so that the size of the ciphertext reduces to $(\alpha+4)b$ bits.

The problem of finding the secret key s when K is given now reduces to solving s from the single equation $$a_\alpha = \left\langle \sum_{i=1}^{m} \langle (f_i)_{\alpha\alpha} s^\alpha \rangle_{q_i} \right\rangle_N.$$

This is still a hard problem if $m>1$, $\alpha>1$.

Forming C as $\langle M+K \rangle_{2^b}$ is a good choice, since the nearly uniform distribution of K ensures that C is distributed (almost) uniformly even if the message M is not uniformly distributed. Other possible choices include $C=F_K(M)$ and $M=F_K^{-1}(C)$ for any 1-parameter set of invertible functions, for instance $F_K(M) = \langle AM+BK \rangle_{2^b}$ for given odd A, B.

$F_K(M) = K \cdot M$, where responding device 200 must pick his random number r such that $K(s,r) \neq 0$.

$F_K(M) = K+M$.

Key agreement system 400 and system 430 may be configured with alternative computation systems for performing multiplication and addition, also known as operations in 'rings'. It is considered that a commutative ring is preferable. Although rings are generally applicable, for readability, the example below is given for polynomial rings. Polynomial rings, like integer rings, are examples of commutative rings. The important difference with the system described above is that the coefficients of polynomials, the second private random value, and the private random value are elements from various polynomials rings. We will use 't' to indicate a formal variable of all the polynomial rings used.

As polynomial rings are known, per se, below only a brief overview is given. We consider the ring $Z_p[t]$, i.e., the ring of polynomials in a variable t with coefficients in $Z_p=Z/(pZ)$; $\{0, 1, \ldots, p-1\}$. An element of this ring is a polynomial $$A(t) = \sum_{k=0}^{\infty} a_k t^k = a_0 + a_1 t + a_2 t^2 + \ldots ,$$

wherein all $a_k \in Z_p$ and the series terminates: there is a K such that all coefficients $a_k=0$ for k>K. The degree of A(t), denoted by deg(A(t)), is the value of K such that $a_K \neq 0$ and $a_k=0$ for all k>K. This defines the degree of all elements of $Z_p[t]$, except for the zero polynomial. The degree of '0', i.e., the zero polynomial, is undefined.

Addition of two polynomials in $Z_p[t]$ may be defined as $$A(t) + B(t) = \sum_{k=0}^{\infty} a_k t^k + \sum_{k=0}^{\infty} b_k t^k = \sum_{k=0}^{\infty} \langle a_k + b_k \rangle_p t^k,$$

wherein $\langle \bullet \rangle_P$ indicates that the argument is evaluated modulo p and lies in $Z_p$. Note that for non-zero polynomials A(t) and B(t) with A(t)+B(t)≠0, it holds that deg(A(t)+B(t))≤max(deg(A(t)), deg(B(t))).

Multiplication of two polynomials in $Z_p[t]$ is defined as $$A(t) \cdot B(t) = \left(\sum_{k=0}^{\infty} a_k t^k\right) \cdot \left(\sum_{k=0}^{\infty} b_k t^k\right) = \sum_{k=0}^{\infty} \left(\sum_{m=0}^{k} a_m b_{k-m}\right)_p t^k.$$

Note that if p is prime, it always holds for non-zero polynomials A(t) and B(t) that deg(A(t)·B(t))=deg(A(t))+deg(B(t)). If p is not prime, this is not necessarily true. We will assume p prime in the following.

Let Q(t) be a non-zero polynomial in $Z_p[t]$ (for prime p). Then any polynomial $A(t) \in Z_p[t]$ can be written uniquely as A(t)=P(t)·Q(t)+R(t), with deg(R(t))<deg(Q(t)). Here P(t) is the result of division of A(t) by Q(t) and R(t) is the remainder. This remainder is denoted by $\langle A(t) \rangle_{Q(t)}$, or A(t) reduced modulo Q(t). The ring $R(Q(t), p):=Z_p[t]/(Q(t)Z_p[t])$, is defined as the set of the zero polynomial and of all polynomials in t with coefficients in $Z_p$ of degree less than deg(Q(t)). Addition of two such polynomials is the same as addition in $Z_p[t]$, multiplication is the same as multiplication in $Z_p[t]$, followed by reduction modulo Q(t).

There is a natural mapping between non-negative integers and p-ary polynomials: the polynomial coefficients correspond to the digits in the p-ary expansion of the integer, so the integer corresponding to a polynomial can be obtained by substituting t=p in the polynomial and evaluating it in Z:

$$A(t) \leftrightarrow A = \sum_{k=0}^{deg(A(t))} a_k p^k.$$

Note that, this mapping does not imply equivalence of reduction modulo a polynomial Q(t) with integer reduction modulo Q. For instance, in $Z_2[t]$ it holds that $1+t^2=(1+t)(1+t)$, so $\langle 1+t^2 \rangle_{1+t}=0$, but $\langle 1+2^2 \rangle_{1+2}=\langle 5 \rangle_3=2\neq 0$.

The set of elements of the ring R(Q(t), p) depends only on the degree of Q(t). Addition of these elements depends on p, as the polynomial coefficients are in $Z_p$, but is independent of Q(t). On the other hand, the result of their multiplication depends on p and Q(t).

Having a defined multiplication and addition in the ring R(Q(t), p) allows to define polynomials in this ring: their arguments are elements of this ring, they have ring-valued coefficients and take values in this ring. A bivariate polynomial F(•,•) of degree α on R(Q(t), p) can thus be written as:

$$F(X(t), Y(t)) = \left\langle \sum_{j=0}^{\alpha} \sum_{k=0}^{\alpha} F_{jk}(t)(X(t))^j(Y(t))^k \right\rangle_{Q(t)} = \sum_{j=0}^{\alpha} \sum_{k=0}^{\alpha} \langle F_{jk}(t)(X(t))^j(Y(t))^k \rangle_{Q(t)},$$

where the summations (in $Z_p[t]$) can be taken outside of the modular reduction operation. We can even add (in $Z_p[t]$) polynomials in different rings $R(Q_1(t), p)$ and $R(Q_2(t), p)$, $R(Q_m(t), p)$:

$$\sum_{i=1}^{m} F_i(X(t), Y(t)) = \sum_{i=1}^{m} \sum_{j=0}^{\alpha} \sum_{k=0}^{\alpha} \langle F_{i,j,k}(t)(X(t))^j(Y(t))^k \rangle_{Q_i(t)}.$$

In all following embodiments we use p=2, which is easier to implement on bit-oriented devices. However, this is not limiting, as other values of p, are also possible, especially prime values. For instance 251 and 65521 are suitable choices as the coefficients fit in a byte and in two-bytes respectively.

In an embodiment, initiating key data generator 110 is configured to select or otherwise obtain in electronic form the following parameters:

a public global reduction polynomial degree, denoted as M;

a key size (B bits)

an integer α, preferably α>1.

security parameter 'b' determining the size of the private random value and second private random value an integer m, preferably m≥2;

A good choice for the parameter M is M=2α(b−1)+B−1, and b=B. A system designer may select these parameters and send them to the initiating key-agreement device 100. Furthermore the initiating key data generator 110 is configured to select or otherwise obtain in electronic form the following parameters:

a public global reduction polynomial N(t)531 $Z_2[t]$. Its degree deg(N(t)) equals M;

public individual reduction polynomials $Q_1(t), \ldots, Q_m(t)$ a public set of bivariate polynomials $F_i(,)$ of degree α in each of its two variables. In each $R(Q_i(t),2)$, a bivariate polynomial $F_i(\bullet,\bullet)$, with coefficients $F_{i,j,k}(t)=F_{i,k,j}(t)$, 1≤i≤m, 0≤j,k≤α.

The key size (B) and the parameter size (b) can be different. It is an option to choose them equal.

With each polynomial in the public set a public individual reduction polynomial $Q_i(t)$ is associated and vice versa. Each particular polynomial $F_i(,)$ in the public set is a bivariate polynomial with coefficients $F_{i,j,k}(t)$ taken from the polynomial ring modulo the public individual reduction polynomial $Q_i(t)$ associated with the particular polynomial $F_i(,)$. The polynomial may be denoted as $F_i(x,y)=\sum_{k=0}^{k\leq\alpha}\sum_{j=0}^{j\leq\alpha}F_{i,j,k}(t)x^iy^j$.

A good way to select the public individual reduction polynomials $Q_i(t)$ is as follows: First select a polynomial $\gamma(t)\in Z_2[t]$ of degree B; then select m polynomials $\beta_1(t), \ldots, \beta_m(t)\in Z_2[t]$, all having a degree at most equal to $M-\alpha(b-1)-B$ and at least one (preferably all) having a degree larger than $M-2\alpha(b-1)-B$; then define m polynomials $Q_1(t), \ldots, Q_m(t)$, where $Q_i(t)=N(t)+\beta_i(t)\gamma(t)$. This choice for the reduction polynomials ensures that the symmetric key obtainer of initiating key-agreement device 100 obtains the same symmetric key used by the responding key-agreement device directly from substituting the private random value in the responding univariate polynomial. Note that the lower limit for the degree of the public individual reduction polynomials may be taken as $-1$. Degree larger than $-1$ means that the degree should be at least 0. The degree must then be at most equal to $\alpha(b-1)-1$. In an embodiment, at least one, or even all, of the public individual reduction polynomials have degree at least 2.

The local reduction polynomials may also be chosen as $Q_i(t)=N(t)-\beta_i(t)\gamma(t)$, wherein $N(t)$, $\beta_i(t)$, and $\gamma(t)$ are taken from $Z_p[t]$, for some $p>2$. This means that these polynomials may be represented with integer coefficients from 0 up to and including $p-1$.

The initiating key-agreement device 100 obtains in electronic form a first private random value s in $\{0, 1, \ldots, 2^b-1\}$, and computes an initiating univariate polynomial by summing over univariate polynomials obtained by substituting the private random value (112, s) into the polynomials of the public set:

$$KM_{s,k}(t) = \sum_{i=1}^{m}\sum_{j=0}^{\alpha}\langle F_{i,j,k}(t)(s(t))^j\rangle_{Q_i(t)}, \quad 0\leq k\leq\alpha.$$

Note that the natural mapping between non-negative integers and p-ary (in this case binary) polynomials has been used to map s to s(t), that is, the coefficients of the binary expansion of s with the coefficients of s(t). The latter could also be generated directly.

As before, the responding key-agreement device comprises a symmetric key obtainer 210, responding key data generator 220 and an (optional) cryptographic unit 320.

Responding key data generator 220 is configured to obtain in electronic form a second private random value r in $\{0, 1, \ldots, 2^b-1\}$. The second private random value is substituted in the initiating univariate polynomial by symmetric key obtainer 210, $$\kappa(s, r, t) = \sum_{k=0}^{\alpha}\langle\langle KM_{s,k}(t)(r(t))^k\rangle_{N(t)}\rangle_{\gamma(t)}.$$

Here, the result is reduced modulo the global public global reduction polynomial and then modulo $\gamma(t)$. The result of this substitution and reductions is a polynomial in the formal variable (t). A symmetric key 214 may be obtained from this in various ways. For example, the polynomial may be converted to a number using the natural mapping. The mapped result or the string of coefficients may be used directly or may be processed, say hashed. Key reduction, extension, entropy amplification and the like may be applied if needed. Responding key-agreement device 200 uses the symmetric key, say, for encrypting a message as before.

The responding key data generator 220 is configured for computing a responding univariate polynomial by summing over univariate polynomials obtained by substituting the second private random value 212 (r) into the polynomials of the public set (122, $f_i(r,)$), and $$KM_{r,k}(t) = \sum_{i=1}^{m}\sum_{j=0}^{\alpha}\langle F_{i,j,k}(t)(r(t))^j\rangle_{Q_i(t)}, \quad 0\leq k\leq\alpha.$$

Initiating key-agreement device 100 comprises a symmetric key obtainer 310 and an (optional) cryptographic unit 230.

The symmetric key obtainer 310 calculates the key $\kappa(r,s)$ from $$\kappa(r, s, t) = \sum_{k=0}^{\alpha}\langle\langle KM_{r,k}(t)(s(t))^k\rangle_{N(t)}\rangle_{\gamma(t)}.$$

Interestingly, the parameters guarantee that $\kappa(r,s)=\kappa(s,r)$. This key, possibly using the same derivation or other further processing as the responding device, may be used to decrypt the cipher text. In this case it is not needed to derive further reconstructed keys.

The bivariate polynomials $F_i(\bullet,\bullet)$ may be chosen as symmetric bivariate polynomials. This is not needed since the keying material that initiating key-agreement device 100 publishes is $KM_{s,k}^{(1)}$, the keying material that responding key-agreement device 200 sends to initiating key-agreement device 100 is $KM_{r,j}^{(2)}$. Both initiating key-agreement device 100 and responding key-agreement device 200 calculate the same key $$\kappa(s, r, t) = \sum_{k=0}^{\alpha}\langle\langle KM_{s,k}^{(1)}(t)(r(t))^k\rangle_{N(t)}\rangle_{\gamma(t)} = \sum_{j=0}^{\alpha}\langle\langle KM_{s,j}^{(2)}(t)(s(t))^k\rangle_{N(t)}\rangle_{\gamma(t)}.$$

Figure 3:
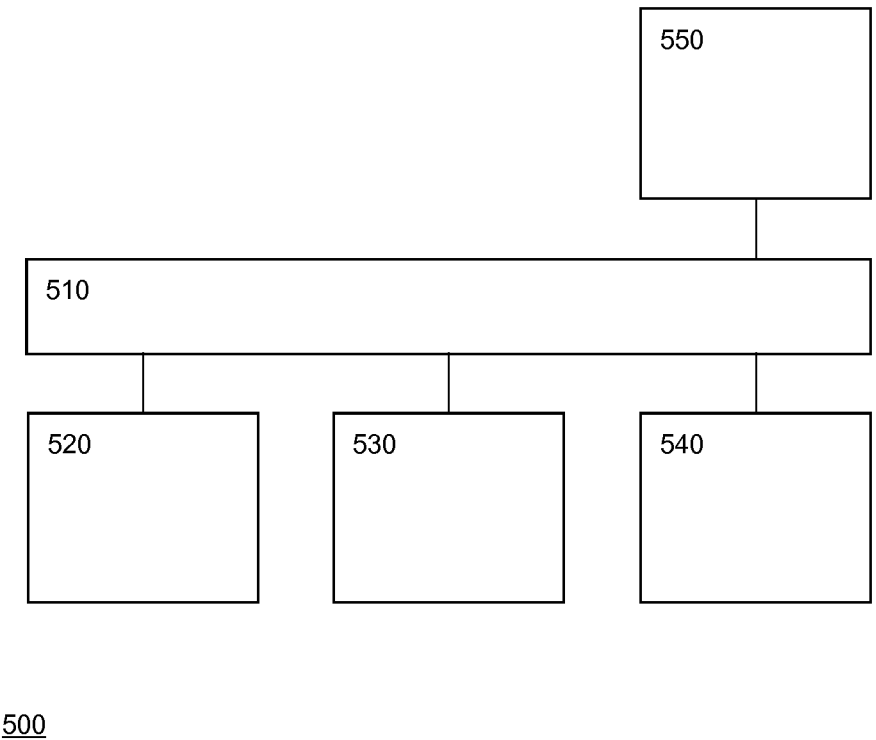
FIG. 3 is schematic block diagram of an integrated circuit 500.

FIG. 3 is schematic block diagram of an integrated circuit 500. Integrated circuit 500 comprises a processor 520, a memory 530, and an I/O unit 540. These units of integrated circuit 500 can communicate amongst each other through an interconnect 510, such as a bus. Processor 520 is configured to execute software stored in memory 530 to execute a method as described herein. In this way integrated circuit 500 may be configured as a initiating key-agreement device 100, and/or an responding device 200; Part of memory 530 may then store a public set, a private random value, a univariate polynomial, a plain message and/or encrypted message as required.

I/O unit 540 may be used to communicate with other devices such as devices 100, or 200, for example to receive a public data, such as public set of bivariate polynomials 122 and possibly associated parameters, moduli and the like, or to send and receive encrypted and/or authenticated messages. I/O unit 540 may comprise an antenna for wireless communication. I/O unit 540 may comprise an electric interface for wired communication.

Integrated circuit 500 may be integrated in a computer, mobile communication device, such as a mobile phone, etc.

Integrated circuit 500 may also be integrated in lighting device, e.g., arranged with an LED device. For example, an integrated circuit 500 configured as a initiating or responding key-agreement device and arranged with lighting unit such as an LED, may receive commands encrypted with a shared symmetric key.

Although polynomial manipulation may be performed by processor 520 as instructed by polynomial manipulation software stored in memory 530, the tasks of key generation, and calculating the univariate polynomials are faster if integrated circuit 500 is configured with optional polynomial manipulation device 550. Polynomial manipulation device 550 is a hardware unit for executing substitution and reduction operations.

Figure 4:
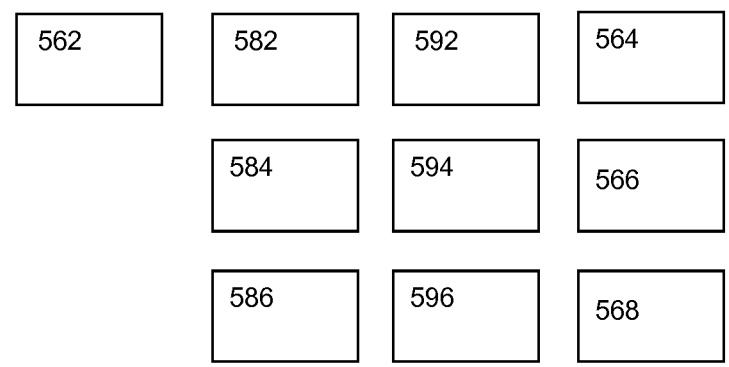
FIG. 4 is a schematic block diagram of a memory layout.

FIG. 4 is a schematic block diagram of a memory layout that may be used with memory 530, in case integrated circuit 500 is configured as initiating key-agreement device 100. Shown in FIG. 4 are: a first private random integer 562, such as s; a public global reduction integer 564, such as N; symmetric bivariate polynomials with integer coefficients 582-586, such as $f_i$, and associated public reduction integers 592-596, such as $q_i$. Furthermore, in FIG. 4 two parts of the memory are reserved as working space to compute initiating univariate polynomial 124. Reduction result 566, is used to substitute private random integer 562 into one of the symmetric bivariate polynomials, and reduce modulo the public reduction integer. For each of the symmetric polynomials the result is then added to a summation result 566 and reduced modulo global integer 564. The layout shown in FIG. 4 is suitable for a system with m=3. The working space may also be used to compute reconstructed symmetric key 312 from responding univariate polynomial 222.

FIG. 4 has been explained for integer rings, however one may also allow the coefficients to be taken from polynomial rings. The required memory should be adapted correspondingly.

Having the polynomials in the public set symmetric simplifies implementation. In an embodiment of key agreement system 400, at least one of the bivariate polynomials in public set 122 is asymmetric. In an embodiment, all polynomials in public set 122 are asymmetric. The key generation works as described above, except that the initiating key-agreement device 100 is configured to substitute the private random value 112 into a particular one of the two variables of the polynomials of set 122. For example, if f(x,y) is one of the bivariate polynomials in set 122, and if the initiating key-agreement device 100 is configured to use the first of the two variables, it computes f(s,y). Summation steps (if any) are as described above. The responding device, receives an initiating univariate polynomial 124. Since the univariate polynomial has only one variable, there is no difference with using symmetric polynomials in public set 122 when substituting the second private random value 212 therein. However, to compute the responding univariate polynomial 222, the encrypting device is configured to substitute the second private random value 212 into a second one of the two variables, i.e., a different one then used by the initiating key-agreement device 100. Following the example above, the responding device would compute f(x,r). Finally, the decryption device receives a univariate polynomial, so there is only one variable available for substitution.

Using asymmetric polynomials may increase security, as it ensures that the initiating univariate polynomial 124 and the responding univariate polynomial 222 have a different structure.

All embodiments given herein using symmetric polynomials in set 122 may be modified to use asymmetric polynomials. The only change needed is to make sure that the responding univariate polynomial 222 is obtained from substituting into one of the two variables of the polynomials in set 122, whereas the initiating univariate polynomial 124 is obtained from substituting into the other of the two variables of the polynomials in set 122.

In an embodiment initiating key-agreement device 100 and responding key-agreement device 200 each have a public/private key pair. Initiating key-agreement device 100 and responding key-agreement device 200 are configured to obtain the public key of the other party. Initiating key-agreement device 100 and responding key-agreement device 200 are configured to sign initiating univariate polynomial 124 and responding univariate polynomial 222 using their respective private keys. Initiating key-agreement device 100 and responding key-agreement device 200 are configured to verify the received signatures and to reject initiating univariate polynomial 124 and/or responding univariate polynomial 222 if the verification fails. Suitable signing and verification protocols include DSA or ECDSA. The public keys may be exchanges using certificates, such as X.509 certificates. Using an ephemeral key agreed using the protocol described herein to encrypt communication between initiating key-agreement device 100 and responding key-agreement device 200 provides forward security: even if one or more of the private keys are leaked, past communication remains secure. The key agreement protocol may also be used anonymously, e.g., without having access to a public key of the other party. For example, initiating key-agreement device 100 and responding key-agreement device 200 may be a communication device, such as a mobile phone, configured for encrypted communication with each other using a shared symmetric key.

For example the initiating key-agreement device and the responding key-agreement device may be mobile communication devices, say mobile phones. Their communication units may be configured for wireless communication, e.g., short-range communication such as NFC or Bluetooth. By bringing the phones together they can establish a secure communication link, by agreeing on a shared key using the system described herein. Even when the phones are no longer within range, they can still securely communicate using the shared key. Once a shared key has been established, the key can be used for other key management functions, say, exchange of public keys in a public/private key encryption system.

The key agreement is suited for low-resource applications. For example, initiating key-agreement device 100 and responding key-agreement device 200 may be devices configured for ad-hoc wireless networks. In this application, it is less critical that the communication between some devices may fail, in case initiating key-agreement device 100 fails to get key 312 the same as key 214. For example, initiating key-agreement device 100 and responding key-agreement device 200 may be lighting devices in which communication unit 330 and communication unit 340 are wireless communication devices. Initiating key-agreement device 100 and responding key-agreement device 200 are part of a set of multiple lighting devices like this, which together from a communication network. Should some device fail to communication, then data may be routed around this.

Note that initiating key-agreement device 100 could generate its own public set of bivariate polynomials 122 and send it to responding key-agreement device 200 with the first message. The advantage of this is that responding key-agreement device 200 and initiating key-agreement device 100 can agree on a common key without requiring any public parameters from third parties. The drawback is that this increases the communication overhead.

Suppose an attacker eavesdrops on the communication. The attacker could obtain initiating univariate polynomial 124 and responding univariate polynomial 222, by eavesdropping. However, the attacker cannot infer s or r from this, so he has no means to calculate key 214, 312.

The construction may be modified slightly so that it also works if public set of bivariate polynomials 122 is not symmetric. This modification is as follows, initiating key-agreement device 100 substitutes first private random value 112 in one of the two variables of public set of bivariate polynomials 122, and responding key-agreement device 200 uses the other of the two variables. This may be agreed beforehand. Initiating key-agreement device 100 and responding key-agreement device 200 use a different 'slot' to calculate their respective univariate polynomial and shared symmetric key. The end result is that both calculate the same common key. In the following explicit embodiments we use symmetric functions.

Figure 5:
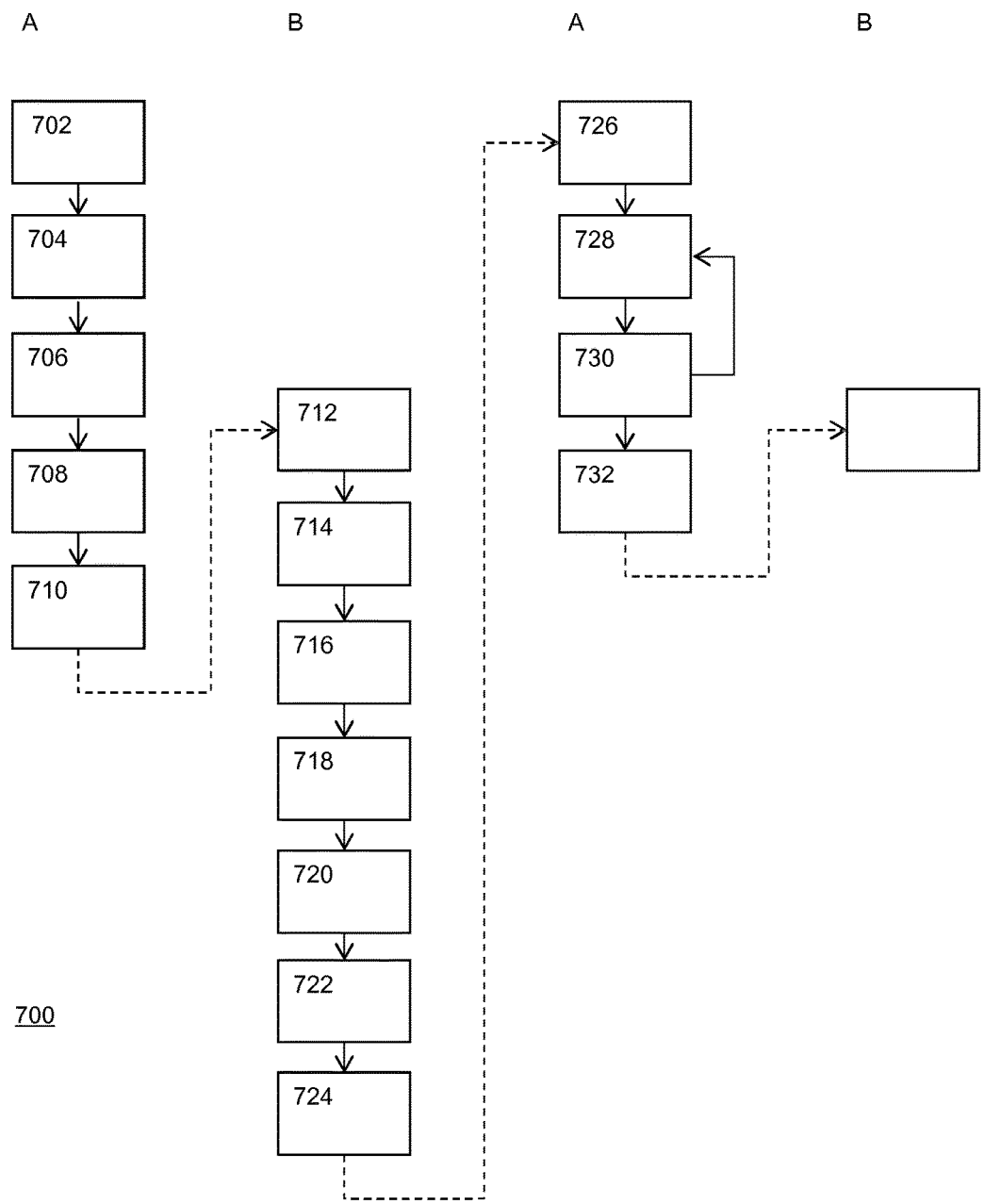
FIG. 5 is a flowchart illustrating a method 700 for key-agreement.

FIG. 5 illustrates in a flowchart a method 700 to generate a symmetric key shared between an initiating key-agreement device 100 and a responding key-agreement device, e.g. devices like initiating key-agreement device 100 and responding key-agreement device 200. Taking only the steps labeled A, a method for an initiating key-agreement device 100 is obtained. Taking only the steps labeled B, a method for a responding key-agreement device is obtained. Method 700 may also be implemented in a distributed manner, i.e., distributed over multiple devices.

FIG. 5 shows:

Generating 702 in electronic form a public set of bivariate polynomials 122, e.g., by key agreement server 450.

Generating 704 in electronic form a first private random value (112, s), e.g., by initiating key-agreement device 100.

Obtaining 706 in electronic form a public set of bivariate polynomials (122, $f_i(,)$), e.g., by initiating key-agreement device 100.

Computing 708 an initiating univariate polynomial (124) by summing the univariate polynomials obtained by substituting the first private random value (112, s) into the polynomials of the public set (122, $f_i(s,)$), e.g., by initiating key-agreement device 100.

Sending 710 the initiating univariate polynomial (124) to the responding key-agreement device (200), e.g., by initiating key-agreement device 100.

Receiving 712, e.g., by responding key-agreement device 200 from initiating key-agreement device 100 an initiating univariate polynomial (124).

Generating 714 in electronic form a second private random value (212, r), e.g., by responding key-agreement device 200.

Obtaining 716 in electronic form a public set of bivariate polynomials (122, $f_i(,)$), e.g., by responding key-agreement device 200.

Computing 718 a responding univariate polynomial (222) by summing over univariate polynomials obtained by substituting the second private random value (r) into the polynomials of the public set (122, $f_i(r,)$), e.g., by responding key-agreement device 200. Computing 720 a shared symmetric key (214, K) by substituting the second private random value (212, r) in the initiating univariate polynomial, e.g., by responding key-agreement device 200.

Optionally, computing 722 key confirmation data from the symmetric key, e.g., by initiating key-agreement device 100.

Sending 724, e.g., by responding key-agreement device 200 to the initiating key-agreement device 100 the responding univariate polynomial (222), and optional key confirmation data.

Receiving 726, e.g., by initiating key-agreement device 100 from the responding key-agreement device 200 a responding univariate polynomial (222), and optional key confirmation data.

Reconstructing 728, e.g., by initiating key-agreement device 100 a shared symmetric key (312, K') by substituting the first private random value (112, s) in the responding univariate polynomial (222). This may be done by, e.g., deriving a first reconstructed key (K') from the result of substituting the first private random value (s) in the responding univariate polynomial and reducing modulo the public global reduction integer (N).

Determining 730, e.g., by initiating key-agreement device 100, from the key confirmation data if the first reconstructed key (K') equals the symmetric key (K) and if not deriving a further reconstructed key from the first reconstructed key (K'). This step is optional.

Encrypting 732 an electronic message with the shared symmetric key (214, 312), e.g., by initiating key-agreement device 100 or responding key-agreement device 200 and/or authenticating the electronic message with the shared symmetric key (214, 312), e.g., by adding a message authentication code.

Decrypting 734 the encrypted electronic message with the shared symmetric key (214, 312), e.g., by initiating key-agreement device 100 or responding key-agreement device 200, and/or verifying the electronic message with the shared symmetric key (214, 312), e.g., by verifying the message authentication code.

Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, steps 718 and 720 may be interchanged, or may be executed, at least partially, in parallel. Moreover, a given step may not have finished completely before a next step is started.

A method according to the invention may be executed using software, which comprises instructions for causing a processor system to perform method 700. Software may only include those steps taken by a particular sub-entity of the system. The software may be stored in a suitable storage medium, such as a hard disk, a floppy, a memory etc. The software may be sent as a signal along a wire, or wireless, or using a data network, e.g., the Internet. The software may be made available for download and/or for remote usage on a server.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into sub-routines and/or be stored in one or more files that may be linked statically or dynamically. Another embodiment relating to a computer program product comprises computer executable instructions corresponding to each of the means of at least one of the systems and/or products set forth.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

LIST OF REFERENCE NUMERALS IN FIGS. 1-4

100 an initiating key-agreement device
110 an initiating key data generator
112 a first private random value
122 a public set of bivariate polynomials
124 an initiating univariate polynomial
200 a responding key-agreement device
210 a symmetric key obtainer
212 a second private random value
214 a symmetric key
220 a responding key data generator
222 a responding univariate polynomial
230 an encryption unit
310 a symmetric key obtainer
312 a reconstructed symmetric key
320 a decryption unit
330, 340 a communication unit
400 a key agreement system
410 a first electronic message containing a public set of bivariate polynomials
420 a second electronic message containing the public set of bivariate polynomials
440 an encrypted and/or authenticated electronic communication
450 a key agreement server
430 a key agreement system
500 an integrated circuit
510 a bus
520 a processor
530 a memory
540 an I/O unit
550 a polynomial manipulation device
562 a first private random integer
564 a public global reduction integer
566 a reduction result
568 a summation result
582-586 a symmetric bivariate polynomial with integer coefficients
592-596 a public reduction integer

The invention claimed is:

1. An initiating key-agreement device configured to generate a symmetric key shared with a responding key-agreement device, the initiating key-agreement device comprising:

an initiating key data generator configured for
  generating in electronic form a first private random value,
  obtaining in electronic form a public set of bivariate polynomials, wherein a different commutative ring is associated with each polynomial of the public set of bivariate polynomials,
  computing an initiating univariate polynomial by summing univariate polynomials obtained by substituting the first private random value into the bivariate polynomials of the public set, wherein each univariate polynomial obtained by substituting the first private random value into a particular bivariate polynomial of the public set is reduced to a canonical form in the commutative ring associated with the particular univariate polynomial;
a communication unit configured for
  sending the initiating univariate polynomial to the responding key-agreement device, and
  receiving from the responding key-agreement device a responding univariate polynomial; and
a symmetric key obtainer configured for
  reconstructing the shared symmetric key by substituting the first private random value in the responding univariate polynomial, wherein
a public global reduction integer, N, is associated with the public set and a public individual reduction integer, qi, is associated with each polynomial of the public set,
the first private random value is an integer, each polynomial in the public set is a bivariate polynomial with integer coefficients, and the initiating univariate polynomial is an univariate polynomial with integer coefficients, and
wherein computing the initiating univariate polynomial further comprises obtaining a set of univariate polynomials by
  for each polynomial of the public set, substituting the first private random value into a respective polynomial and reducing modulo the public individual reduction integer associated with said polynomial, and
  summing the set of univariate polynomials and reducing modulo the public global reduction integer,
wherein the shared symmetric key is for symmetric encryption and/or decryption of electronic messages.

2. A responding key-agreement device configured to generate a symmetric key shared with the initiating key-agreement device according to claim 1,
a communication unit configured for
  receiving from the initiating key-agreement device the initiating univariate polynomial;
a responding key data generator configured for
  generating in electronic form a second private random value,
  obtaining in electronic form a public set of bivariate polynomials, wherein a different commutative ring is associated with each polynomial of the public set of bivariate polynomials, and
  computing a responding univariate polynomial by summing over univariate polynomials obtained by substituting the second private random value into the bivariate polynomials of the public set, wherein each univariate polynomial obtained by substituting the second private random value into a particular bivariate polynomial of the public set is reduced to a canonical form in the commutative ring associated with the particular univariate polynomial, the communication unit being further configured for sending to the initiating key-agreement device the responding univariate polynomial; and a symmetric key obtainer configured for computing the shared symmetric key by substituting the second private random value in the initiating univariate polynomial, wherein the shared symmetric key is for symmetric encryption and/or decryption of electronic messages.

3. The initiating key-agreement device as in claim 1, further comprising one or more of:

an encryption unit configured for encrypting an electronic message with the shared symmetric key, and a decryption unit configured for decrypting an encrypted electronic message with the shared symmetric key.

4. The initiating key-agreement device as in claim 1, wherein the public set of bivariate polynomials only comprises symmetric bivariate polynomials, and/or the public set of bivariate polynomials comprises at least two different bivariate polynomials, and/or at least one polynomial of the public set has a degree of at least two in one of the two variables of said at least one polynomial.

5. The initiating key-agreement device as in claim 1, wherein the initiating univariate polynomial is represented as a list of coefficients of the initiating univariate polynomial in a canonical form, and the responding univariate polynomial is represented as a list of coefficients of the responding univariate polynomial in a canonical form.

6. The initiating key-agreement device as in claim 1, wherein computing the shared symmetric key further comprises substituting a second private random value in the initiating univariate polynomial and reducing modulo the public global reduction integer.

7. The initiating key-agreement device as in claim 1, wherein the public global reduction integer, N, is an odd number larger than $2^{(\alpha+2)b-1}$ and/or lower than $2^{(\alpha+2)b}$, wherein a represents the highest degree in one of the two variables of the polynomials in the public set, and b represents a key length, and for each public individual reduction integer, $q_i$, the public global reduction integer, N, minus said public individual reduction integer, $q_i$, is a multiple of 2 to the power of the key length, given by the expression:

$$q_i = N - \beta_i 2^b, \text{ where } 1 \leq \beta_i < 2^b, \text{ and}$$

is less than 2 to the power of twice the key length, and wherein computing the shared symmetric key further comprises reducing modulo 2 to the power of the key length.

8. The initiating key-agreement device as in claim 1, wherein the symmetric key obtainer of the initiating key-agreement device is configured for deriving a first reconstructed key from the result of substituting the first private random value in the responding univariate polynomial and reducing modulo the public global reduction integer, determining from key confirmation data if the first reconstructed key equals the symmetric key and if not, then deriving a further reconstructed key from the first reconstructed key, wherein the key confirmation data is computed by the responding key data generator from the symmetric key for verifying if a reconstructed key equals said symmetric key, and wherein deriving a further reconstructed key comprises adding the public global reduction integer or a multiple of the public global reduction integer to the first reconstructed key and reducing modulo the 2 to the power of the key length.

9. An initiating key-agreement device configured to generate a symmetric key shared with a responding key-agreement device, the initiating key-agreement device comprising:

an initiating key data generator configured for generating in electronic form a first private random value, obtaining in electronic form a public set of bivariate polynomials, wherein a different commutative ring is associated with each polynomial of the public set of bivariate polynomials, computing an initiating univariate polynomial by summing univariate polynomials obtained by substituting the first private random value into the bivariate polynomials of the public set, wherein each univariate polynomial obtained by substituting the first private random value into a particular bivariate polynomial of the public set is reduced to a canonical form in the commutative ring associated with the particular univariate polynomial;

a communication unit configured for sending the initiating univariate polynomial to the responding key-agreement device, and receiving from the responding key-agreement device a responding univariate polynomial; and a symmetric key obtainer configured for reconstructing the shared symmetric key by substituting the first private random value in the responding univariate polynomial, wherein the symmetric key obtainer of the initiating key-agreement device is configured for deriving a first reconstructed key from the result of substituting the first private random value in the responding univariate polynomial and reducing modulo the public global reduction integer, and determining from key confirmation data if the first reconstructed key equals the symmetric key and if not, then deriving a further reconstructed key from the first reconstructed key, wherein the key confirmation data is computed by the responding key data generator from the symmetric key for verifying if a reconstructed key equals said symmetric key, wherein the shared symmetric key is for symmetric encryption and/or decryption of electronic messages.

10. An initiating key-agreement device configured to generate a symmetric key shared with a responding key-agreement device, the initiating key-agreement device comprising:

an initiating key data generator configured for generating in electronic form a first private random value, obtaining in electronic form a public set of bivariate polynomials, wherein a different commutative ring is associated with each polynomial of the public set of bivariate polynomials, computing an initiating univariate polynomial by summing univariate polynomials obtained by substituting the first private random value into the bivariate polynomials of the public set, wherein each univariate polynomial obtained by substituting the first private random value into a particular bivariate polynomial of the public set is reduced to a canonical form in the commutative ring associated with the particular univariate polynomial;

a communication unit configured for
sending the initiating univariate polynomial to the responding key-agreement device, and
receiving from the responding key-agreement device a responding univariate polynomial; and a symmetric key obtainer configured for
reconstructing the shared symmetric key by substituting the first private random value in the responding univariate polynomial, wherein a public global reduction polynomial is associated with the public set and public individual reduction polynomials are associated with each polynomial of the public set, the first private random value and the second private random value are polynomials, each particular polynomial in the public set is a bivariate polynomial with coefficients taken from the polynomial ring modulo the public individual reduction polynomial associated with the particular polynomial, the initiating univariate polynomial has polynomial coefficients, and wherein computing the initiating univariate polynomial comprises obtaining a set of univariate polynomials by
for each polynomial of the public set, substituting the first private random value into a respective polynomial and reducing modulo the public individual reduction polynomial associated with said respective polynomial, and summing the set of univariate polynomials, and wherein computing the symmetric key comprises substituting the second private random value in the initiating univariate polynomial and reducing modulo the public global reduction polynomial, wherein the shared symmetric key is for symmetric encryption and/or decryption of electronic messages.

11. A system for key agreement comprising an initiating key-agreement device configured to generate a symmetric key shared with a responding key-agreement device, the initiating key-agreement device comprising:

an initiating key data generator configured for
generating in electronic form a first private random value,
obtaining in electronic form a public set of bivariate polynomials, wherein a different commutative ring is associated with each polynomial of the public set of bivariate polynomials, and
computing an initiating univariate polynomial by summing univariate polynomials obtained by substituting the first private random value into the bivariate polynomials of the public set, wherein each univariate polynomial obtained by substituting the first private random value into a particular bivariate polynomial of the public set is reduced to a canonical form in the commutative ring associated with the particular univariate polynomial, a communication unit configured for
sending the initiating univariate polynomial to the responding key-agreement device, and
receiving from the responding key-agreement device a responding univariate polynomial, and a symmetric key obtainer configured for
reconstructing the shared symmetric key by substituting the first private random value in the responding univariate polynomial, wherein a public global reduction integer, N, is associated with the public set and a public individual reduction integer, qi, is associated with each polynomial of the public set, the first private random value is an integer, each polynomial in the public set is a bivariate polynomial with integer coefficients, and the initiating univariate polynomial is an univariate polynomial with integer coefficients, and wherein computing the initiating univariate polynomial further comprises obtaining a set of univariate polynomials by
for each polynomial of the public set, substituting the first private random value into a respective polynomial and reducing modulo the public individual reduction integer associated with said polynomial, and summing the set of univariate polynomials and reducing modulo the public global reduction integer; and a responding key-agreement device configured to generate the symmetric key shared with the initiating key-agreement device, the responding key-agreement device comprising:

a communication unit configured for
receiving from the initiating key-agreement device an initiating univariate polynomial, a responding key data generator configured for
generating in electronic form a second private random value,
obtaining in electronic form a public set of bivariate polynomials, wherein a different commutative ring is associated with each polynomial of the public set of bivariate polynomials, and
computing a responding univariate polynomial by summing over univariate polynomials obtained by substituting the second private random value into the bivariate polynomials of the public set, wherein each univariate polynomial obtained by substituting the second private random value into a particular bivariate polynomial of the public set is reduced to a canonical form in the commutative ring associated with the particular univariate polynomial, the communication unit being further configured for sending to the initiating key-agreement device the responding univariate polynomial, and a symmetric key obtainer configured for computing the shared symmetric key by substituting the second private random value in the initiating univariate polynomial, wherein the shared symmetric key is for symmetric encryption and/or decryption of electronic messages.

12. An initiating key-agreement method configured to generate a symmetric key shared with a responding key-agreement device, the initiating key-agreement method comprising:

generating in electronic form a first private random value,
obtaining in electronic form a public set of bivariate polynomials, wherein a different commutative ring is associated with each polynomial of the public set of bivariate polynomials,
computing an initiating univariate polynomial by summing over univariate polynomials obtained by substituting the first private random value into the bivariate polynomials of the public set, wherein each univariate polynomial obtained by substituting the first private random value into a particular bivariate polynomial of the public set is reduced to a canonical form in the commutative ring associated with the particular univariate polynomial, sending the initiating univariate polynomial to the responding key-agreement device, receiving from the responding key-agreement device a responding univariate polynomial, and reconstructing the shared symmetric key by substituting the first private random value in the responding univariate polynomial, wherein a public global reduction integer, N, is associated with the public set and a public individual reduction integer, qi, is associated with each polynomial of the public set, the first private random value is an integer, each polynomial in the public set is a bivariate polynomial with integer coefficients, and the initiating univariate polynomial is an univariate polynomial with integer coefficients, and wherein computing the initiating univariate polynomial further comprises obtaining a set of univariate polynomials by for each polynomial of the public set, substituting the first private random value into a respective polynomial and reducing modulo the public individual reduction integer associated with said polynomial, and summing the set of univariate polynomials and reducing modulo the public global reduction integer, wherein the shared symmetric key is for symmetric encryption and/or decryption of electronic messages.

13. A responding key-agreement method implemented via a responding key-agreement device configured to generate a symmetric key shared with an initiating key-agreement device, the initiating key-agreement device configured to perform the initiating key-agreement method according to claim 12, the responding key-agreement method comprising:

receiving from the initiating key-agreement device the initiating univariate polynomial, generating in electronic form a second private random value, computing the shared symmetric key by substituting the second private random value in the initiating univariate polynomial, computing a responding univariate polynomial by summing over univariate polynomials obtained by substituting the second private random value into bivariate polynomials of a public set, wherein a different commutative ring is associated with each bivariate polynomial of the public set, wherein each univariate polynomial obtained by substituting the second private random value into a particular bivariate polynomial of the public set is reduced to a canonical form in the commutative ring associated with the particular univariate polynomial, and sending to the initiating key-agreement device the responding univariate polynomial, wherein the shared symmetric key is for symmetric encryption and/or decryption of electronic messages.

14. A non-transitory computer-readable medium embodied with a computer program that comprises a set of instructions executable by a computer for enabling the computer to carry out a method for an initiating key-agreement to generate a symmetric key shared with a responding key-agreement device, when the computer program is executed on the computer, the method comprising:

generating in electronic form a first private random value, obtaining in electronic form a public set of bivariate polynomials, wherein a different commutative ring is associated with each polynomial of the public set of bivariate polynomials, computing an initiating univariate polynomial by summing over univariate polynomials obtained by substituting the first private random value into the bivariate polynomials of the public set, wherein each univariate polynomial obtained by substituting the first private random value into a particular bivariate polynomial of the public set is reduced to a canonical form in the commutative ring associated with the particular univariate polynomial, sending the initiating univariate polynomial to the responding key-agreement device, receiving from the responding key-agreement device a responding univariate polynomial, and reconstructing the shared symmetric key by substituting the first private random value in the responding univariate polynomial, wherein a public global reduction integer, N, is associated with the public set and a public individual reduction integer, qi, is associated with each polynomial of the public set, the first private random value is an integer, each polynomial in the public set is a bivariate polynomial with integer coefficients, and the initiating univariate polynomial is an univariate polynomial with integer coefficients, and wherein computing the initiating univariate polynomial further comprises obtaining a set of univariate polynomials by for each polynomial of the public set, substituting the first private random value into a respective polynomial and reducing modulo the public individual reduction integer associated with said polynomial, and summing the set of univariate polynomials and reducing modulo the public global reduction integer, wherein the shared symmetric key is for symmetric encryption and/or decryption of electronic messages.

* * * * *